(12) United States Patent
Albright et al.

(10) Patent No.: US 10,295,184 B2
(45) Date of Patent: May 21, 2019

(54) BURNER WITH MONITORING

(71) Applicant: Air Products and Chemicals, Inc., Allentown, PA (US)

(72) Inventors: Christopher Michael Albright, Allentown, PA (US); Reed Jacob Hendershot, Orefield, PA (US); Michael J. Gallagher, Coopersburg, PA (US); Thomas David Matthew Lee, Basingstoke (GB); Aleksandar Georgi Slavejkov, Allentown, PA (US); Mark Daniel D'Agostini, Allentown, PA (US); Tunc Goruney, Gebze-Kocaeli (TR)

(73) Assignee: Air Products and Chemicals, Inc., Allentown, PA (US)

( * ) Notice: Subject to any disclaimer, the term of this patent is extended or adjusted under 35 U.S.C. 154(b) by 428 days.

(21) Appl. No.: 15/026,309

(22) PCT Filed: Apr. 29, 2015

(86) PCT No.: PCT/US2015/028284
§ 371 (c)(1),
(2) Date: Mar. 31, 2016

(87) PCT Pub. No.: WO2015/168278
PCT Pub. Date: Nov. 5, 2015

(65) Prior Publication Data
US 2016/0238246 A1 Aug. 18, 2016

Related U.S. Application Data

(60) Provisional application No. 61/987,653, filed on May 2, 2014.

(51) Int. Cl.
*F23L 7/00* (2006.01)
*F23N 1/02* (2006.01)
(Continued)

(52) U.S. Cl.
CPC .............. *F23N 1/022* (2013.01); *F23D 14/32* (2013.01); *F23L 7/007* (2013.01); *F23N 5/022* (2013.01);
(Continued)

(58) Field of Classification Search
CPC ................. F23D 14/32; F23N 1/022
(Continued)

(56) References Cited

U.S. PATENT DOCUMENTS

| 3,689,042 A | * | 9/1972 | Pere ........................ C21D 9/70 432/49 |
| 5,575,637 A | * | 11/1996 | Slavejkov ............. C03B 5/2353 431/10 |

(Continued)

FOREIGN PATENT DOCUMENTS

| CN | 101900641 | 12/2010 |
| CN | 102667344 | 9/2012 |

(Continued)

OTHER PUBLICATIONS

European Patent Office, International Search Report of the International Searching Authority, dated Jul. 28, 2015, for PCT/US2015/028284.

*Primary Examiner* — Avinash A Savani
*Assistant Examiner* — Aaron H Heyamoto
(74) *Attorney, Agent, or Firm* — Larry S. Zelson

(57) ABSTRACT

An oxy-fuel burner (10) with monitoring including a fuel passage (320) terminating in a fuel nozzle (322), a primary oxidant passage (330) terminating in an oxidant nozzle (333), one or more sensors including a nozzle temperature sensor (372) for sensing at least one of an oxidant nozzle temperature and a fuel nozzle temperature, and a data processor (66, 166,266) programmed to receive data from the sensors and to determine based on at least a portion of (Continued)

the received data the presence or absence of an abnormal burner condition including a potential partial obstruction of at least one of the primary oxidant passage (330) and the fuel passage (320) based on an increase or decrease in at least one of the oxidant nozzle temperature and the fuel nozzle temperature.

13 Claims, 21 Drawing Sheets

(51) Int. Cl.
*F23N 5/24* (2006.01)
*F23D 14/32* (2006.01)
*F23N 5/02* (2006.01)

(52) U.S. Cl.
CPC .......... *F23N 5/242* (2013.01); *F23N 2025/16* (2013.01); *Y02E 20/344* (2013.01)

(58) Field of Classification Search
USPC .......................................................... 431/12
See application file for complete search history.

(56) References Cited

U.S. PATENT DOCUMENTS

| | | | | |
|---|---|---|---|---|
| 8,176,881 | B2* | 5/2012 | Arensmeier | F23N 5/242 |
| | | | | 122/14.22 |
| 2003/0047196 | A1 | 3/2003 | Bartels et al. | |
| 2009/0308293 | A1* | 12/2009 | Kim | F23N 3/082 |
| | | | | 110/189 |
| 2010/0132691 | A1* | 6/2010 | Leidig | F24C 3/067 |
| | | | | 126/39 BA |
| 2010/0318274 | A1* | 12/2010 | Krull | F23M 11/00 |
| | | | | 701/100 |
| 2011/0146543 | A1* | 6/2011 | Marcano | F23C 5/28 |
| | | | | 110/185 |

FOREIGN PATENT DOCUMENTS

| | | |
|---|---|---|
| CN | 102927591 | 2/2013 |
| KR | 20020084952 A * | 11/2002 |
| WO | 2013077861 A1 | 5/2013 |

* cited by examiner

| Pitch (degrees) | Roll (degrees) | Result |
|---|---|---|
| 0 | 0 | Normal operation |
| +2.055 | +0.066 | Flame impingement |
| +1.937 | -0.841 | Flame impingement |

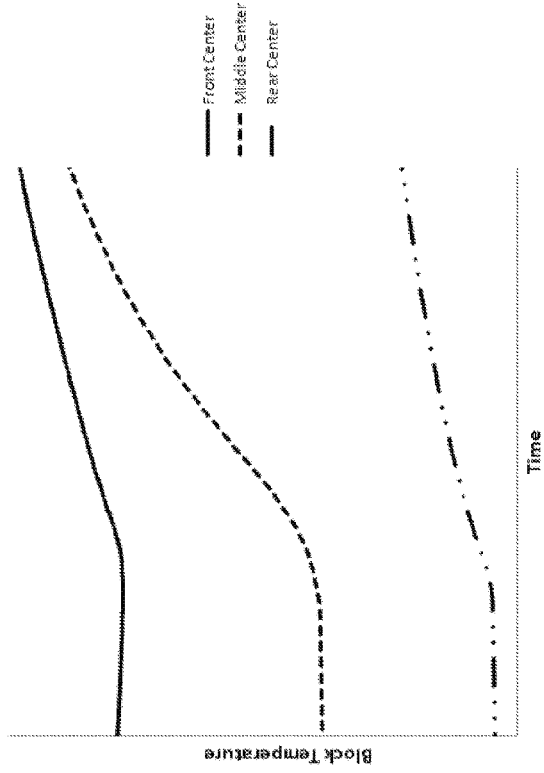
Fig. 18C
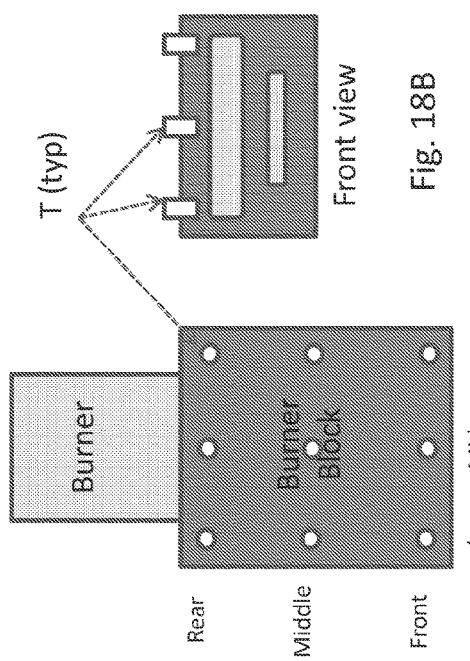
Fig. 18B Front view
Fig. 18A Top view

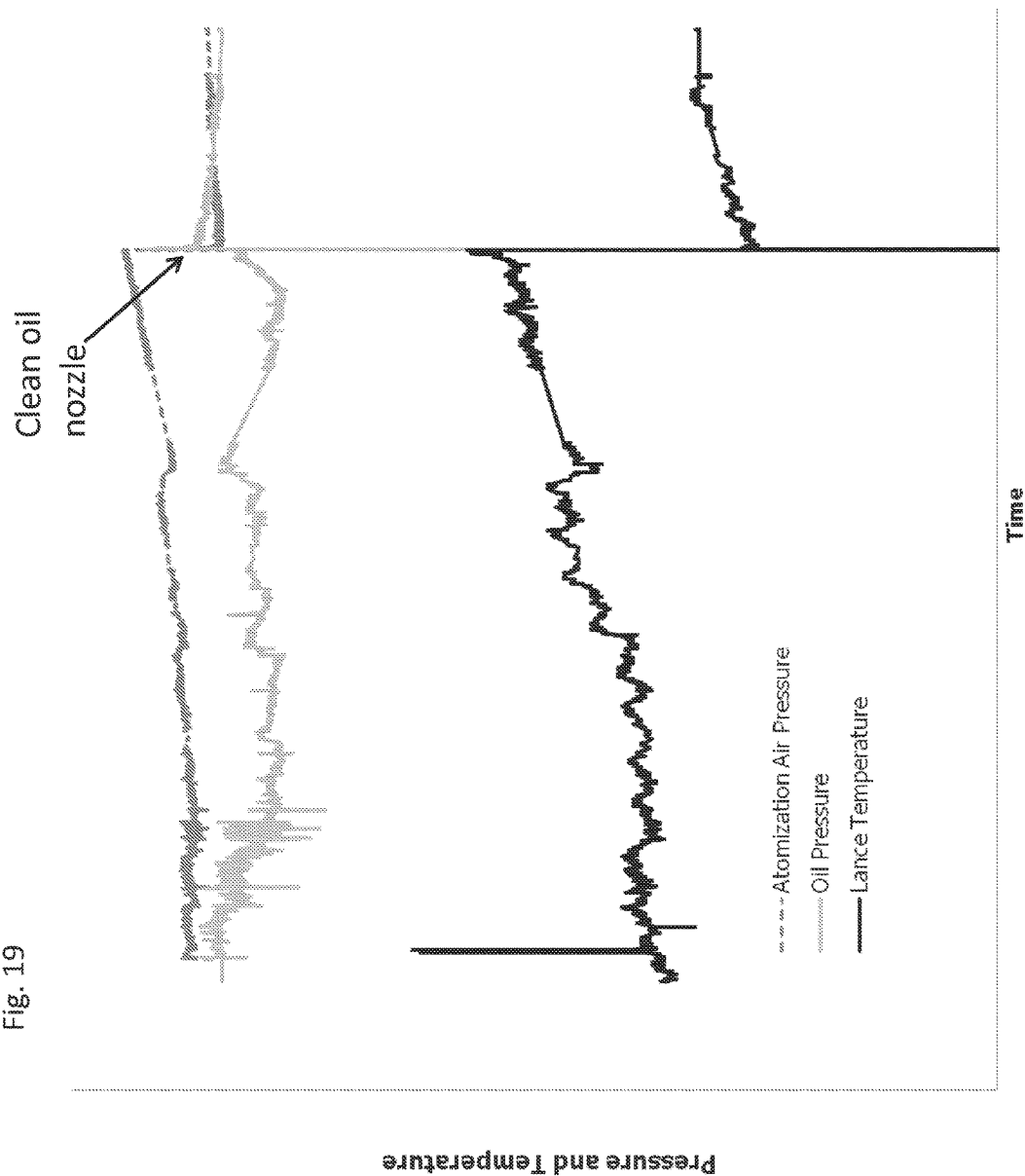

BURNER WITH MONITORING

CROSS-REFERENCE TO RELATED APPLICATIONS

This application claims the benefit priority of U.S. Provisional Application No. 61/987,653 filed on May 2, 2014, which is incorporated by reference herein in its entirety.

BACKGROUND

This application relates to an oxy-fuel burner, and in particular a staged oxy-fuel burner, configured with instrumentation to monitor the status and health of the burner, as well as burner operation and its effect on the process, to perform real-time control of burner operation based on data obtained from such monitoring, and to enable intelligent preventative maintenance to be conducted no sooner than necessary but prior to a failure or unforeseen shutdown condition.

For conventional burner systems, furnace operators determine a maintenance schedule on past experience, or on a regular calendar basis. This frequently results in a maintenance schedule that is overly aggressive, costing excess man hours and burner downtime, or is overly lax, failing to capture correctable burner issues before a failure occurs.

Systems exist for limited monitoring of various burner parameters, but none integrates this monitoring in a comprehensive way to enable predictive maintenance. For example, some existing systems require optical access of a flame, temperature sensors to prevent overheating, or pressure sensors to monitor flame instability. But none monitor combinations of parameters in a way that enables predictive maintenance.

SUMMARY

An oxy-fuel burner, and in some embodiments a staged oxy-fuel burner, as described herein is configured with integrated sensors to measure several parameters that are useful in monitoring the health of the burner and in predicting the need for maintenance. For any oxy-fuel burner, these parameters may include, without limitation, separately or in combination, the inlet fuel pressure, temperature, and density, the inlet oxidant pressure, temperature, and density, the staging valve position (for a staged burner), the fuel nozzle temperature, the oxygen nozzle temperature, burner block temperatures at various locations, one or more installation angles of the burner and/or burner block, the relative and/or absolute position of the burner with respect to other features of the furnace, charge or bath temperatures, and optical emissions from the flame or the burner face. For a staged oxy-oil burner, those parameters may include one or more parameters, separately or in combination, including but not limited to the inlet oil temperature, the inlet oil pressure, the atomizing oxidant (air or oxygen-enriched air or oxygen) pressure, the oxygen feed pressure, the staging valve position, the lance tip or atomizing nozzle temperature, and the burner block temperature. This information collected from these sensors can be used by operators/engineers directly, or by an automated monitoring and alerting system, to monitor the performance of the burner, to identify any maintenance needs of the burner, for example to schedule maintenance and improve the burner operation, and to detect burner system malfunctions.

Such instrumentation can be integrated into any burner, including a burner that uses one or more of gaseous fuel, liquid fuel, and solid fuel, and including a non-staged burner, a fuel-staged burner, an oxidant-staged burner, and a burner in which both fuel and oxidant are staged. It is understood that for each type of burner, the type, position, and quantity of sensors can be customized to correspond to the operational modes and parameters most relevant to that particular burner.

Various features are built into the burner so that the electronic monitoring does not interfere with normal operation and maintenance of the burner. The instrumentation is also protected so that it will continue to function for long periods of time in the type of harsh environments in which burners normally operate. In one embodiment, the electronics are battery powered and transmit data wirelessly for ease of installation and maintenance.

A burner with integrated sensors can be used as part of a system for remote tracking of burner parameters to enable real-time monitoring of burner performance arid to assist in predictive maintenance by detecting changes in operation of the burner before a failure or shutdown occurs, such as is described in commonly owned U.S. patent application Ser. No. 14/268,655 entitled "Remote Burner Monitoring System and Method" filed May 2, 2014, which is incorporated by reference herein in its entirety.

Aspect 1: An oxy-fuel burner with monitoring, comprising: a fuel passage terminating in a fuel nozzle; a primary oxidant passage terminating in an oxidant nozzle; one or more sensors for sensing process data including a nozzle temperature sensor for sensing at least one of an oxidant nozzle temperature and a fuel nozzle temperature; and a data processor programmed to receive process data from the sensors and to determine based on at least a portion of the received data the presence or absence of an abnormal burner condition.

Aspect 2: The burner with monitoring of Aspect 1, wherein the data processor is programmed to identify a potential partial obstruction of at least one of the primary oxidant passage and the fuel passage based on an increase or decrease in at least one of the oxidant nozzle temperature and the fuel nozzle temperature.

Aspect 2a: The burner with monitoring of Aspect 2, wherein the one or more sensor is an oxidant nozzle temperature sensor for sensing the oxidant nozzle temperature, and wherein the data processor is programmed to identify a potential partial obstruction of the primary oxidant passage based on an increase or decrease in the oxidant nozzle temperature.

Aspect 2b: The burner with monitoring of Aspect 2, wherein the one or more sensor is a fuel nozzle temperature sensor for sensing the fuel nozzle temperature, and wherein the data processor is programmed to identify a potential partial obstruction of the fuel passage based on an increase or decrease in the fuel nozzle temperature.

Aspect 3: The burner with monitoring of Aspect 1 to 2b, wherein the data processor is programmed to base its determination at least in part upon changes in at least a portion of the received data with time.

Aspect 4: The burner with monitoring of any of Aspects 1 to 3, the one or more sensors further including an oxidant pressure sensor positioned in the primary oxidant passage for sensing a primary oxidant pressure; wherein the data processor is programmed to identify a potential partial obstruction of the primary oxidant passage based on a change to the primary oxidant pressure and at least one of the fuel nozzle temperature and the oxidant nozzle temperature.

Aspect 5: The burner with monitoring of any of Aspects 1 to 3, further comprising: a secondary oxidant passage spaced apart at a fixed distance from the primary oxidant passage; and a staging valve for proportioning oxidant between the primary and secondary oxidant passages; the one or more sensors further including a staging valve position sensor for sensing a staging valve position as indicative of the relative proportion of oxidant being directed to the primary and secondary oxidant passages; wherein the data processor is further programmed to determine the presence or absence of a partial obstruction of the primary oxidant passage based on the staging valve position and at least one of the fuel nozzle temperature and the oxidant nozzle temperature.

Aspect 6: The burner with monitoring of any of Aspects 1 to 3, further comprising: a secondary oxidant passage spaced apart at a fixed distance from the primary oxidant passage; and a staging valve for proportioning oxidant between the primary and secondary oxidant passages; the one or more sensors further including: an oxidant pressure sensor for sensing an oxidant pressure at one or more of upstream of the staging valve, downstream of the staging valve in the primary oxidant passage, and downstream of the staging valve in the secondary oxidant passage; and a staging valve position sensor for sensing a staging valve position as indicative of the relative proportion of oxidant being directed to the primary and secondary oxidant passages; wherein the data processor is further programmed to determine the presence or absence of one or more of a partial obstruction of one of the primary oxidant passage and the secondary oxidant passage and a sub-optimal staging valve position, based on the staging valve position and the oxidant pressure at one or more of upstream of the staging valve, downstream of the staging valve in the primary oxidant passage, and downstream of the staging valve in the secondary oxidant passage.

Aspect 7: The burner with monitoring of any of Aspects 5 to 6, further comprising: two pressure sensors, one positioned on either side of a flow restriction device in at least one of the fuel passage, the primary oxidant passage, and the secondary oxidant passage, for sensing a pressure upstream of the flow restriction device, a pressure downstream of the flow restriction device, and a differential pressure across the flow restriction device as indicative of flow rate; wherein the data processor is further programmed to determine the presence or absence of an abnormal burner condition based on the differential pressure and one of the pressures upstream and downstream of the flow restriction device.

Aspect 8: The burner with monitoring of any of Aspects 1 to 7, further comprising: a burner block having a hot face adjacent to the furnace; and a burner block temperature sensor for sensing a burner block temperature near the hot face; wherein the data processor is further programmed to receive data from the burner block temperature sensor and to determine the presence or absence of one or more of burner block overheating and flame asymmetry based on the burner block temperature.

Aspect 9: The burner with monitoring of any of Aspects 1 to 8, further comprising: a position sensor for sensing a burner installation angle, the position sensor being configured to sense one or more of a burner pitch and a burner roll; wherein the data processor is further programmed to determine whether the burner is installed at a desired orientation with respect to at least one feature of the furnace based on the burner installation angle.

Aspect 10: The burner with monitoring of any of Aspects 1 to 9, further comprising: a unique identifier on a removable component of the burner; wherein the data processor is further programmed to use the unique identifier to tag data for analysis purposes.

Aspect 11: The burner with monitoring of any of Aspects 1 to 10, further comprising: a data collector programmed to provide power to individual sensors only when data is to be collected, based on one or both of a combination of sensed data and a periodic schedule, and taking into account the specific requirements of each of the individual sensors; a transmitter for wirelessly transmitting sensor data from the data collector to the data processor; and a local power generation system for powering the data collector, the sensors, and the transmitter.

Aspect 12: The burner with monitoring of any of Aspects 1 to 11, wherein the oxidant passage is annular and surrounds the fuel passage.

Aspect 13: A method of determining an operating condition of an oxy-fuel burner including a fuel passage terminating in a fuel nozzle, a primary oxidant passage terminating in an oxidant nozzle, and a burner block having a face adjacent to the furnace, the method comprising: sensing burner parameters from one or more sensors selected from the group consisting of temperature sensors, pressure sensors, density sensors, flow sensors, position sensors, angle sensors, contact sensors, accelerometers, optical sensors, and combinations thereof; comparing the sensed parameters with expected values for each said burner parameter to determine the presence or absence of a deviation in the burner parameter; and determining the presence of an abnormal burner condition based on the presence of a deviation in one or more burner parameters.

Aspect 14: The method of Aspect 13, further comprising: sensing at least one of an oxidant nozzle temperature and a fuel nozzle temperature; comparing the at least one nozzle temperature to a threshold temperature; and determining a potential partial obstruction of one of the oxidant nozzle and fuel nozzle based on an increase or decrease in the at least one nozzle temperature.

Aspect 15: The method of Aspect 14, further comprising: sensing an oxidant pressure; and determining a potential partial obstruction of the oxidant nozzle based on the oxidant pressure and the at least one nozzle temperature.

Aspect 16: The method of Aspect 13 or 14, the burner further including a secondary oxidant passage spaced apart at a fixed distance from the primary oxidant passage and a staging valve for proportioning oxidant between the primary and secondary oxidant passages, the method further comprising: sensing a staging valve position indicating the proportion of oxidant being directed to the primary and secondary oxidant passages; determining a potential partial obstruction of the primary oxidant passage based on the staging valve position and the at least one nozzle temperature.

Aspect 17: The method of Aspect 13 or 14, the burner further including a secondary oxidant passage spaced apart at a fixed distance from the primary oxidant passage and a staging valve for proportioning oxidant between the primary and secondary oxidant passages, the method further comprising: sensing an oxidant pressure from a location selected from upstream of the staging valve, downstream of the staging valve In the primary oxidant passage, and downstream of the staging valve in the secondary oxidant passage; sensing a staging valve position indicating the proportion of oxidant being directed to the primary and secondary oxidant passages; determining one or more of a potential partial obstruction of one of the primary oxidant passage and the secondary oxidant passage and a sub-optimal staging valve position based on the staging valve position and the oxidant pressure at one or more of upstream of the staging valve, downstream of the staging valve in the primary oxidant passage, and downstream of the staging valve in the secondary oxidant passage.

Aspect 18: The method of any of Aspects 13 to 17, further comprising: sensing pressures at two locations, one on either side of a flow restriction device in at least one of the fuel passage, the primary oxidant passage, and the secondary oxidant passage; determining a flow rate from the pressures at the two locations; and determining the presence or absence of an abnormal burner condition based on the flow rate and the pressure of at least one of the two locations.

Aspect 19: The method of any of Aspects 13 to 18, further comprising: sensing a burner installation angle, including at least one of a burner pitch and a burner roll; and determining whether the burner is installed at a desired orientation with respect to at least one feature of the furnace based on the burner installation angle.

Aspect 19a: The method of any of Aspects 13 to 19, wherein the oxidant passage is annular and surrounds the fuel passage.

Aspect 20: An oxy-fuel burner with monitoring, comprising; a fuel passage having a fuel nozzle at a tip end and a fuel inlet distal from the tip end; a primary oxidant passage surrounding the fuel passage; a temperature sensor positioned in the fuel nozzle at the tip end of the fuel passage for sensing a fuel temperature; a fuel pressure sensor positioned near the fuel inlet for sensing a fuel pressure; and an instrument enclosure for receiving data from the sensors.

Aspect 21: The burner with monitoring of Aspect 19 or 20 further comprising: a secondary oxidant passage spaced apart at a fixed distance from the primary oxidant passage: a staging valve for proportioning oxidant between the primary and secondary oxidant passages; an oxidant pressure sensor positioned upstream and/or downstream of the staging valve for sensing an oxidant inlet pressure; and a staging valve position sensor for sensing a staging valve position as indicative of the relative proportion of oxidant being directed to the primary and secondary oxidant passages.

Aspect 22: The burner with monitoring of Aspect 20 or 21, further comprising: a data processor for receiving data from the sensors, wherein the data processor is programmed to determine based on data received from one or more sensors the presence or absence of an abnormal burner condition or sensor malfunction.

Aspect 23: The burner with monitoring of any of Aspects 20 to 22, further comprising: a position sensor for sensing an installation angle of the burner and optionally parts that the burner is mounted to; wherein the installation angle of the burner is usable to further indicate whether the burner is installed at a desired orientation and/or slope with respect to the furnace, Aspect 24: The burner with monitoring of any of Aspects 20 to 24, further comprising: a unique identifier on the primary oxidant passage; wherein the primary oxidant passage identifier is usable to tag data for analysis purposes.

Aspect 25: The burner with monitoring of any one of Aspects 20 to 24, the instrument enclosure comprising: a data collector programmed to provide power to individual sensors only when data is to be collected, based on one or both of a combination of sensed data and a periodic schedule, and taking into account the specific requirements of each of the individual sensors; and a transmitter for wirelessly transmitting sensor data from the data collector to a data center.

Aspect 26: The burner with monitoring of Aspect 25, the instrument enclosure further comprising: a local power generation system for powering the data collector, the sensors, and the transmitter.

Aspect 27: An oxy-fuel burner with monitoring, comprising: a primary first reactant passage terminating in a first reactant nozzle; a primary second reactant passage terminating in a second reactant nozzle; one or more sensors including a temperature sensor for sensing a nozzle temperature of at least one of the reactant nozzles; and a data processor programmed to receive data from the sensors and to determine based on at least a portion of the received data the presence or absence of an abnormal burner condition including a potential partial obstruction of at least one of the primary first reactant passage and the primary second reactant passage based on an increase or decrease in at least one of the reactant nozzle temperatures; wherein one of the first and second reactants is a fuel and the other of the first and second reactants is an oxidant.

Aspect 28: The burner with monitoring of Aspect 27, wherein the one or more sensor is a nozzle temperature sensor for sensing the first reactant nozzle temperature, and wherein the data processor is programmed to identify a potential partial obstruction of the primary first reactant passage based on an increase or decrease in the first reactant nozzle temperature.

Aspect 29: The burner with monitoring of Aspect 27 or 28, wherein the data processor is programmed to base its determination at least in part upon changes in at least a portion of the received data with time.

Aspect 30: The burner with monitoring of any of Aspects 27 to 29, the one or more sensors further including a first reactant pressure sensor positioned in the primary first reactant passage for sensing a primary oxidant pressure; wherein the data processor is programmed to identify a potential partial obstruction of the primary first reactant passage based on a change to the primary first reactant pressure and the at least one nozzle temperature, Aspect 31: The burner with monitoring of any of Aspects 27 to 29, further comprising: a secondary first reactant passage spaced apart at a fixed distance from the primary first reactant passage; and a staging valve for proportioning the first reactant between the primary and secondary first reactant passages; the one or more sensors further including a staging valve position sensor for sensing a staging valve position as indicative of the relative proportion of the first reactant being directed to the primary and secondary first reactant passages; wherein the data processor is further programmed to determine the presence or absence of a partial obstruction of the primary first reactant passage based on the staging valve position and the at least one nozzle temperature.

Aspect 32: The burner with monitoring of any of Aspects 27 to 29, further comprising: a secondary first reactant passage spaced apart at a fixed distance from the primary first reactant passage; and a staging valve for proportioning the first reactant between the primary and secondary first reactant passages; the one or more sensors further including: a first reactant pressure sensor for sensing a first reactant pressure at one or more of upstream of the staging valve, downstream of the staging valve in the primary first reactant passage, and downstream of the staging valve in the secondary first reactant passage; and a staging valve position sensor for sensing a staging valve position as indicative of the relative proportion of the first reactant being directed to the primary and secondary first passages; wherein the data processor is further programmed to determine the presence or absence of one or more of a partial obstruction of one of the primary first reactant passage and the secondary first reactant passage and a sub-optimal staging valve position based on the staging valve position and the first reactant pressure at one or more of upstream of the staging valve, downstream of the staging valve in the primary first reactant passage, and downstream of the staging valve in the secondary first reactant passage.

Aspect 33: The burner with monitoring of any of Aspects 31 and 32, further comprising: two pressure sensors, one positioned on either side of a flow restriction device in at least one of the primary first reactant passage, the primary second reactant passage, and the secondary first reactant passage, for sensing a pressure upstream of the flow restriction device, a pressure downstream of the flow restriction device, and a differential pressure across the flow restriction device as indicative of flow rate; wherein the data processor is further programmed to determine the presence or absence of an abnormal burner condition based on the differential pressure and one of the pressure upstream and downstream of the flow restriction device.

Aspect 34: The burner with monitoring of any of Aspects 27 to 33, further comprising: a burner block having a hot face adjacent to the furnace; and a burner block temperature sensor for sensing a burner block temperature near the hot face; wherein the data processor is further programmed to determine the presence or absence of one or more of burner block overheating and flame asymmetry based on the burner block temperature.

Aspect 35: The burner with monitoring of any of Aspects 27 to 34, further comprising: a position sensor for sensing a burner installation angle, the position sensor being configured to sense one or more of a burner pitch and a burner roll; wherein the data processor is further programmed to determine whether the burner is installed at a desired orientation with respect to at least one feature of the furnace based on the burner installation angle.

Aspect 36: The burner with monitoring of any of Aspects 27 to 35, further comprising: a data collector programmed to provide power to individual sensors only when data is to be collected, based on one or both of a combination of sensed data and a periodic schedule, and taking into account the specific requirements of each of the individual sensors; a transmitter for wirelessly transmitting sensor data from the data collector to the data processor; and a local power generation system for powering the data collector, the sensors, and the transmitter.

Aspect 37: The burner with monitoring of any of Aspects 27 to 36, wherein the first reactant passage is annular and surrounds the second reactant passage.

Aspect 38: The burner with monitoring of any of Aspects 27 to 37, wherein the first reactant is a fuel and the second reactant is an oxidant.

Aspect 39: The burner with monitoring of any of Aspects 27 to 37, wherein the first reactant is an oxidant and the second reactant is a fuel.

Aspect 40: A method of determining an operating condition of an oxy-fuel burner including a first reactant passage terminating in a first reactant nozzle, a primary second reactant passage terminating in a second reactant nozzle, and a burner block having a face adjacent to the furnace, the method comprising: sensing burner parameters from one or more sensors selected from the group consisting of temperature sensors, pressure sensors, flow sensors, position sensors, angle sensors, contact sensors, accelerometers, optical sensors, and combinations thereof; comparing the sensed parameters with expected values for each said burner parameter to determine the presence or absence of a deviation in the burner parameter; and determining the presence of an abnormal burner condition based on the presence of a deviation in one or more burner parameters.

Aspect 41: The method of Aspect 40, further comprising: sensing at least one of a first reactant nozzle temperature and a second reactant nozzle temperature; comparing the at least nozzle temperature to a threshold temperature; and determining a potential partial obstruction of one of the first and second reactant nozzles based on an increase or decrease in the at least one nozzle temperature.

Aspect 42: The method of Aspect 40 or 41, further comprising: sensing a first reactant pressure: and determining a potential partial obstruction of the first reactant nozzle based on the first reactant pressure and the at least one nozzle temperature.

Aspect 43: The method of Aspect 40 or 41, the burner further including a secondary first reactant passage spaced apart at a fixed distance from the primary first reactant passage and a staging valve for proportioning the first reactant between the primary and secondary first reactant passages, the method further comprising: sensing a staging valve position indicating the proportion of the first reactant being directed to the primary and secondary first reactant passages; determining a potential partial obstruction of the primary first reactant passage based on the staging valve position and the at least one nozzle temperature, Aspect 44: The method of Aspect 40 or 41, the burner further including a secondary first reactant passage spaced apart at a fixed distance from the primary first reactant passage and a staging valve for proportioning the first reactant between the primary and secondary, first reactant passages, the method further comprising: sensing a first reactant pressure from a location selected from upstream of the staging valve, downstream of the staging valve in the primary first reactant passage, and downstream of the staging valve in the secondary first reactant passage; sensing a staging valve position indicating the proportion of the first reactant being directed to the primary and secondary first reactant passages; determining one or more of a potential partial obstruction of one of the primary first reactant passage and the secondary first reactant passage and a sub-optimal staging valve position based on the staging valve position and the first reactant pressure at one or more of upstream of the staging valve, downstream of the staging valve in the primary first reactant passage, and downstream of the staging valve in the secondary first reactant passage.

Aspect 45: The method of any of Aspects 40 to 44, further comprising: sensing pressures from two locations, one on either side of a flow restriction device in at least one of the second reactant passage, the primary first reactant passage, and the secondary first reactant passage; determining a flow rate from the pressures at the two locations; and determining the presence or absence of an abnormal burner condition based on the flow rate and the pressure of at least one of the two locations.

Aspect 46: The method of any of Aspects 40 to 45, further comprising: sensing a burner installation angle, including at least one of a burner pitch and a burner roll; and determining whether the burner is installed at a desired orientation with respect to at least one feature of the furnace based on the burner installation angle.

Aspect 47: The method of any of Aspects 40 to 46, wherein the first reactant passage is annular and surrounds the second reactant passage.

Aspect 48: The method of any of Aspects 40 to 47, wherein the first reactant is a fuel and the second reactant is an oxidant.

Aspect 49: The method of any of Aspects 40 to 47, wherein the first reactant is an oxidant and the second reactant is a fuel.

Other aspects of the invention are described below.

BRIEF DESCRIPTION OF THE DRAWINGS

FIGS. 18A and 18B are a top view and a front view, respectively, of a burner mounted in a burner block, showing thermocouples mounted in a grid in the burner block at front, middle, and rear locations axially, as well as at left, middle, and right locations laterally. FIG. 18C shows measured block temperature at the lateral middle location for a misaligned burner that was fired first with 100% staging (relatively flat temperature curves) and then 0% staging (upward sloping temperature curves).

FIG. 19 is a graph illustrating fuel oil lance tip temperature, oil pressure, and atomization pressure for an oxy-oil burner as in FIG. 1A, showing an lance temperature increasing steadily over time prior to cleaning of the oil nozzle, but oil pressure and atomization pressure not showing the same clear trend.

DETAILED DESCRIPTION

Described herein is a burner system configured to be able to detect an abnormal burner condition, which may include, but is not limited to, partial obstruction of a flow passage, overheating of a portion of the burner, and/or improper installation orientation, and also to distinguish an abnormal burner condition from sensor failure.

Figure 9:
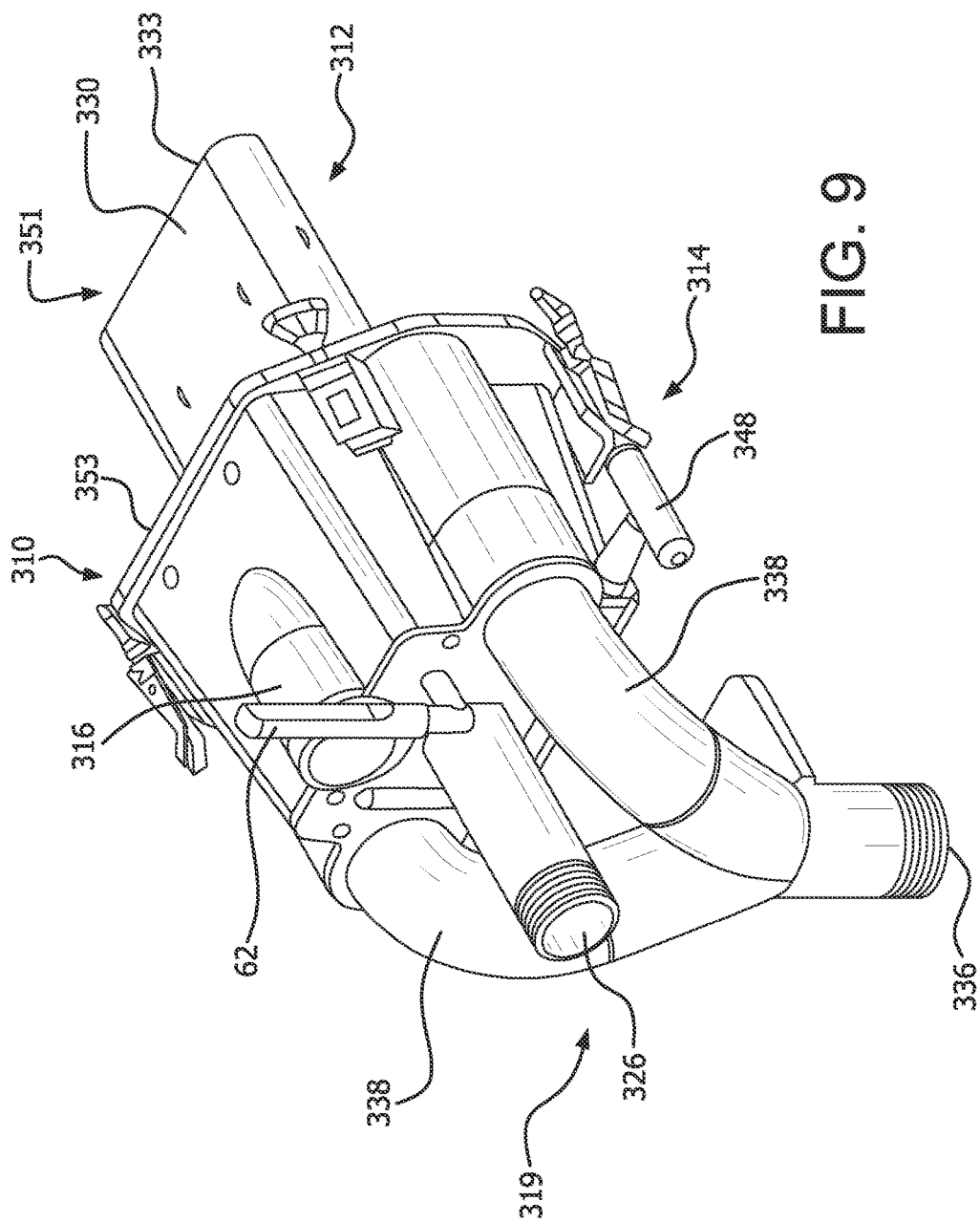
FIG. 9 is a rear perspective view of an oxy-gas burner with monitoring for insertion into a burner block.
Figure 10:
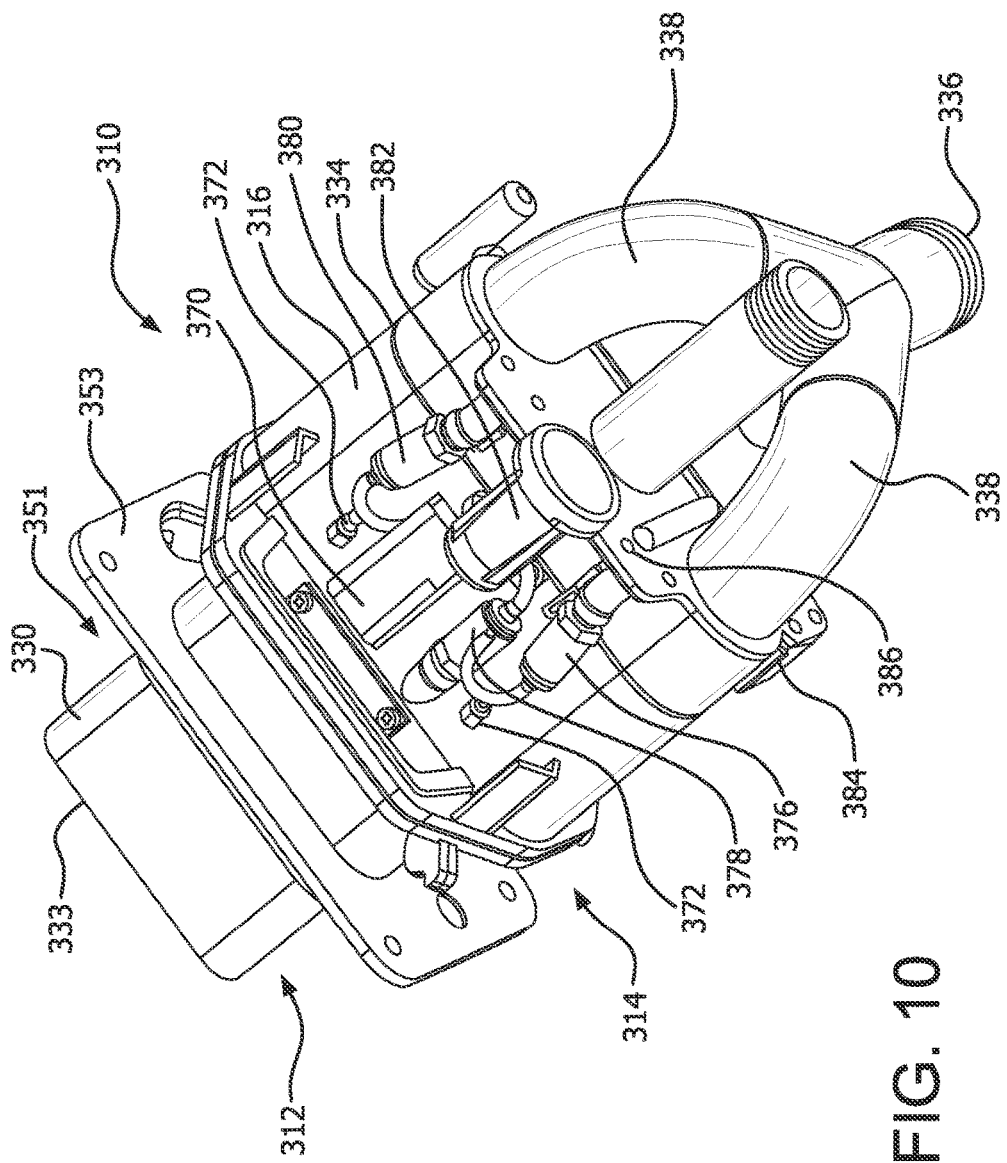
FIG. 10 is a partially cut away rear perspective view of an oxy-gas burner with monitoring as in FIG. 9.
Figure 12:
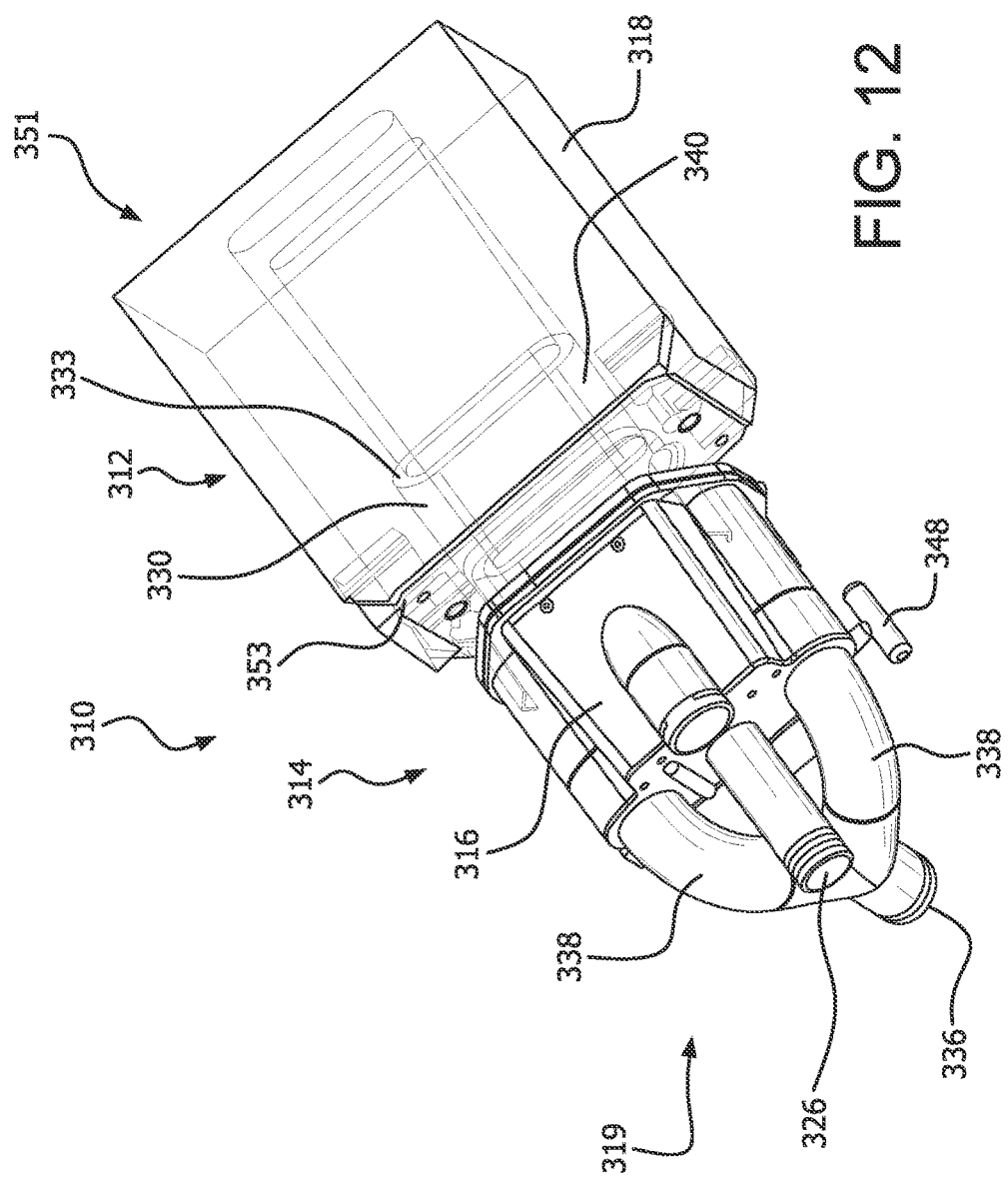
FIG. 12 is a rear perspective view of an oxy-gas burner with monitoring as in FIG. 9 inserted in a burner block.

FIGS. 1A, 1B, 2, and 5 depict an embodiment of a staged oxy-oil burner 10 with integrated sensors, power supply, and communications equipment. FIGS. 9, 10, and 12 depict an embodiment of a staged oxy-gas burner 310 with integrated sensors. Although particular embodiments of burners, either oxy-oil or oxy-gas, are described herein as an exemplary embodiments of a burner with monitoring, the same or similar communications equipment and methods, along with similar or analogous integrated sensors, customized to the configuration, design, arid operational mode of the particular burner, can be used on burners that combust gaseous fuel, liquid fuel, or solid fuel with an oxidant. In particular, with the exception of parameters that relate specifically to oil combustion, such as the oil and atomizing gas inlet pressures, all of the parameters and sensors described herein similarly apply to a burner for combusting any fuel, including gaseous fuel, solid fuel (e.g., petcoke) in a carrier gas, or liquid fuel.

Additionally, in a staged oxy-fuel burner, one or both of fuel and oxidant (e.g., oxygen) is staged such that a primary stream participates in initial combustion while a secondary stream participates in delayed combustion away from the burner. For example, for oxidant staging, the oxidant is proportioned between a primary oxidant passage and a secondary oxidant passage, with the secondary oxidant being supplied to at least one secondary oxidant nozzle spaced apart from the primary oxidant nozzle(s) and fuel nozzle(s). Such staging may be accomplished by a staging valve upstream of the primary and secondary oxidant passages that proportions one incoming oxidant stream between the two passages. Alternatively, the flow to each of the primary and secondary oxidant passages may be independently controlled, manually or automatically, by a separate control valve or by fixed flow restrictors. In other burners, fuel may be staged similarly, using either a staging valve or separate flow controls for primary and secondary streams. Further, in some burners, both fuel and oxidant may be staged.

The power supply is preferably a battery or local power generation for ease of installation arid to avoid possible safety issues with wired power. The sensors may include, in any combination, temperature sensors, pressure sensors, density sensors, flow sensors, position sensors, angle sensors, contact sensors, accelerometers, and optical sensors.

Examples of burners such as the burner 10 and the burner 310, but without sensors, are described in U.S. Pat. Nos. 5,575,637, 5,611,682, 7,390,189, 8,172,566, and 8,512,033, which are incorporated herein by reference in their entirety.

The burner 10 has a discharge end 51 and an inlet end 19. For convenience of description, the discharge end 51 is sometimes referred to herein as the front or forward direction of the burner 10, while the inlet end 19 is sometimes referred to as the rear or rearward direction of the burner 10. When the burner 10 is mounted in a furnace, the discharge end 51 faces the interior of the furnace.

The burner 10 includes a burner block 12, a burner body 14 positioned rearward from burner block 12 with respect to the furnace, and an instrument enclosure 16 positioned rearward with respect to the burner body 14. The burner body 14 includes a mounting plate 53 that is secured to the burner block 12. The burner block 12 has a front face 18 that, when mounted, faces into the furnace.

The burner block 12 includes a primary oxidant passage 30. In the depicted embodiment, the primary oxidant passage 30 has an elongated cross-sectional shape with a major axis (defining a width) longer than a minor axis (defining a height). In particular, the depicted primary oxidant passage 30 has the shape of a rectangle with semi-circular ends, and a width-to-height ratio from about 5 to about 30. However, in other embodiments, the primary oxidant passage 30 may have a circular, oval, ovalized rectangular, rectangular, or other shape.

An oil lance 20 is positioned within the primary oxidant passage 30 and has an oil nozzle 22 at its discharge end. In the depicted embodiment, the oil nozzle is an atomizing nozzle 22. The atomizing nozzle 22 is substantially surrounded by the primary oxidant passage 30 so that atomized fuel oil discharged from the nozzle 22 will mix intimately with the primary oxidant stream upon discharge. Preferably, the oil lance 20 and the nozzle 22 are separately manufactured parts that are joined together, for example by welding, to form a unitary lance with nozzle. In the depicted embodiment, the oil lance 20 substantially centrally positioned within the primary oxidant passage 30, although it is understood that the oil lance 20 may be located in a non-central location provided the nozzle 22 is adapted to distribute the atomized oil to be adequately mixed with the primary oxidant stream for combustion. Alternatively, for an oxy-gas burner, a gaseous fuel passage can be positioned within the primary oxidant passage 30 in place of the oil lance 20.

The burner block 12 further includes a secondary oxidant passage 40 spaced apart by a fixed distance from the primary oxidant passage 30. In the depicted embodiment, the secondary oxidant passage 40 has an elongated cross-sectional shape with a major axis (defining a width) longer than a minor axis (defining a height), similar to the primary oxidant passage 30. In particular, the depicted secondary oxidant passage 40 has the shape of a rectangle with semi-circular ends, and a width-to-height ratio from about 5 to about 30, which may be the same as or different from the width-to-height ratio of the primary oxidant passage 30. The major axis of the secondary oxidant passage 40 is substantially parallel to the major axis of the primary oxidant passage 30. However, in other embodiments, the second oxidant passage 40 may have a circular, oval, ovalized rectangular, rectangular, or other shape, and preferably but not necessarily approximately the same shape as the primary oxidant passage 30.

The primary oxidant passage 30 is fed oxidant from a primary oxidant conduit 32 positioned in the burner body 14 and extending into a rear portion of the burner block 12. Oxidant is fed through a pair of oxidant inlets 38 into an oxidant plenum 36 that in turn feeds the primary oxidant conduit 32. A diffuser 34 may be positioned between the oxidant inlets 38 and the oxidant plenum 36 to aid in straightening out the primary oxidant flow prior to entering the primary oxidant conduit 32.

The secondary oxidant passage 40 is fed oxidant from a secondary oxidant conduit 42 positioned in the burner body 14 and extending into a rear portion of the burner block 12. A staging valve 48 in the burner body 14 redirects a portion of the oxidant supplied by the oxidant inlets 38 into the secondary oxidant conduit 42. The term "staging ratio" is used to describe the proportion of oxidant that is redirected to the secondary oxidant conduit 42, and thus away from the primary oxidant conduit 32. For example, at a staging ratio of 30%, 70% of the oxidant is directed to the primary oxidant conduit 32 (and thus to the primary oxidant passage 30) as a primary oxidant stream and 30% of the oxidant is directed to the secondary oxidant conduit 42 (and thus to the secondary oxidant passage 40) as a secondary oxidant stream.

The oxidant gas fed to the oxidant inlets 38 may be any oxidant gas suitable for combustion, including air, oxygen-enriched air, and industrial grade oxygen. The oxidant preferably has a molecular oxygen ($O_2$) content of at least about 23 mol %, at least about 30 mol %, at least about 70 mol %, or at least about 98 mol %.

The oil lance 20 extends rearward through the burner body 14 and through the instrument enciosure 16. Fuel oil is supplied to the oil lance 20 through an oil inlet 26. Due to the viscosity of fuel oil, it is typically necessary to also supply an atomizing gas to the oil lance 20 through an atomizing gas inlet 28. The atomizing gas may be any gas capable of atomizing the fuel oil as it exits the nozzle 22, including air, oxygen-enriched air, or industrial grade oxygen.

Various temperature sensors may be used for monitoring the temperature of burner components and for help in determining fuel inlet conditions. In the depicted embodiment of FIGS. 1A, 1B, 2, and 5, a temperature sensor 102 such as a thermocouple is embedded in the atomizing nozzle 22 in the oil lance 20 for measuring the temperature at the discharge end of the oil lance 20. The temperature sensor 102 may be a thermocouple or any other suitable sensor. The sensor 102 is fitted into a blind hole (not shown) in a rear side of the nozzle 22. Because the sensor 102 must be removable for maintenance and replacement, it is not welded in place. Leads (not shown) connected to the temperature sensor 102 are routed back along the oil lance 20 to the instrument enclosure 16. To protect the leads 104 from abrasion, overheating, and other harsh conditions of the furnace environment, it is desirable to encase the leads. However, it is difficult from a manufacturing perspective to form a small diameter hole for a substantial portion of the length of the oil lance 20. Therefore, the leads are preferably recessed in a channel 106 along the length of the lance, and a sheath (not shown) is positioned over the channel 106 to protect the leads. In one embodiment, the sheath mates with an outer wall of the lance 20 to seal the leads and temperature sensor 102 from the furnace environment, to provide mechanical protection to the leads and temperature sensor 102, and to limit the flow disturbances of the primary oxidant stream flowing in the primary oxidant passage 30 and around the oil lance 20.

Temperature sensors may be placed on other components of the burner 10 to monitor operational parameters such as burner integrity, flame stability, flame position. For example, one or more temperature sensors 110 may be mounted in the burner block 12 near the front face 18 or near the flow passages. The temperature sensors 110 are preferably set back slightly from the front face 18 to protect them from the furnace environment. The temperature sensors 110 may be centered with respect to the primary oxidant passage 30, or offset from the minor axis centerline and may be used to determine whether the flame is impinging on the burner block 12 or whether the flame is centered about the oil lance 20 or the primary oxidant passage 30. Temperature sensors may even be positioned in other locations of the furnace proximate to the burner for monitoring combustion conditions. Optical sensors may also, or alternatively, be used to monitor the light intensity from the block, with increased emissions from the block indicating potential flame impingement, An oil feed temperature sensor 112 is positioned in the oil stream near the oil inlet 26 to monitor the temperature of the oil being supplied to the burner 10. It is important to ensure that the viscosity of the oil stream will enable proper oil atomization, and the viscosity is a function of temperature as well as oil composition. Therefore, for any particular oil composition, an optimum temperature range can be determined for atomization.

Figure 4:
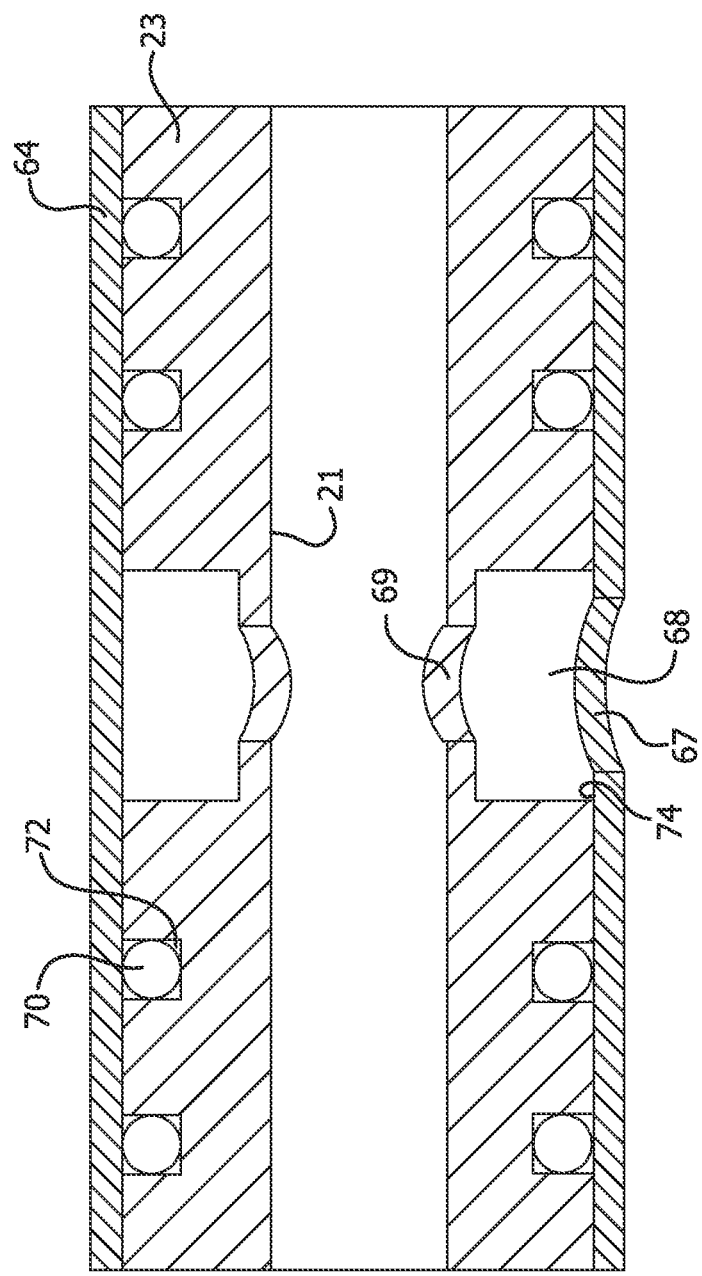
FIG. 4 as a partial side view of an oil lance showing o-ring seals for maintaining and oil seal with the oil lance around a sensor access port.

The oil feed temperature sensor 112 must be able to measure the oil inlet temperature, but is preferably also positioned so as to permit lance cleaning without removing the temperature sensor 112. In the depicted embodiment of a rear portion of the oil lance 20 in FIG. 4, a sealing mechanism 61 is provided at the rear portion of the lance 20. The sealing mechanism 61 includes a body 23 through which the bore 21 extends in a longitudinal direction, and a sleeve 64 surrounding the body 23. The sealing mechanism 61 enables the temperature sensor 112 to be near the flowing oil stream in the lance 20 but also out of the way of the bore 21 of the lance 20, so that the bore 21 can be cleaned and so that the body 23 can be removed from the sleeve 64 without removing the temperature sensor 112. The body 23 includes a sensor well 68 surrounded to the front and rear by two pairs of o-rings 70 seated in o-ring grooves 72, which seal against an inner surface 74 of the sleeve 64. An access opening 69, or multiple such openings, enables oil flowing through the bore 21 to enter the sensor well 68.

A sensor port 67 is located in the sleeve 64, and the temperature sensor 112 is secured (e.g., by threads or other mechanism) into the sensor port 67 so as to have its sensing tip flush with or slightly recessed from the inner surface 74 of the sleeve 64. Experiments have shown that a temperature sensor 112 mounted as shown and described is appropriately sensitive in responding to changes in oil inlet temperature. Consequently, the temperature sensor 112 is able to measure the oil temperature in the bore 21, or at least a temperature that has experimentally shown to be accurately representative of the oil temperature, while still permitting the body 23 to be removed from the sleeve 64 for cleaning without having to disturb the temperature sensor 112.

Because the sensor well 68 extends around the entire circumference of the body 23, the body 23 may include multiple sensor ports 67 to enable mounting of multiple sensors. Also, multiple access openings 69 may be present to provide better uniformity of the oil in the sensor well 68. This arrangement allows the oil stream to contact the temperature sensor 112 while maintaining a seal with the sleeve 64 to prevent any oil leakage. Specifically, by mounting the temperature sensor 112 nearly flush with the bore, the temperature sensor 112 is in contact with oil that is indicative of current oil temperatures. Also, by being flush or nearly flush, the temperature sensor 112 will not block physical components that are inserted into the bore 21 of the oil lance 20 for cleaning and to allow the body 23 to be removed from the oil lance 20 for cleaning. In one embodiment, the temperature sensor 112 may be fitted with a male NPT fitting to mate with a female NPT thread in the sensor port 67.

In the depicted embodiment, pressure sensors are also installed in the burner 10. A pressure sensor 114 is positioned in the oil stream near the oil inlet 26. The pressure sensor 114 may be mounted in the same sealing mechanism 61 as the temperature sensor 112, with the pressure sensor 114 being located in a different sensor port (not shown). Alternatively, the pressure sensor 114 may be mounted in a separate sealing mechanism having essentially the same construction as the sealing mechanism 61.

Figure 5:
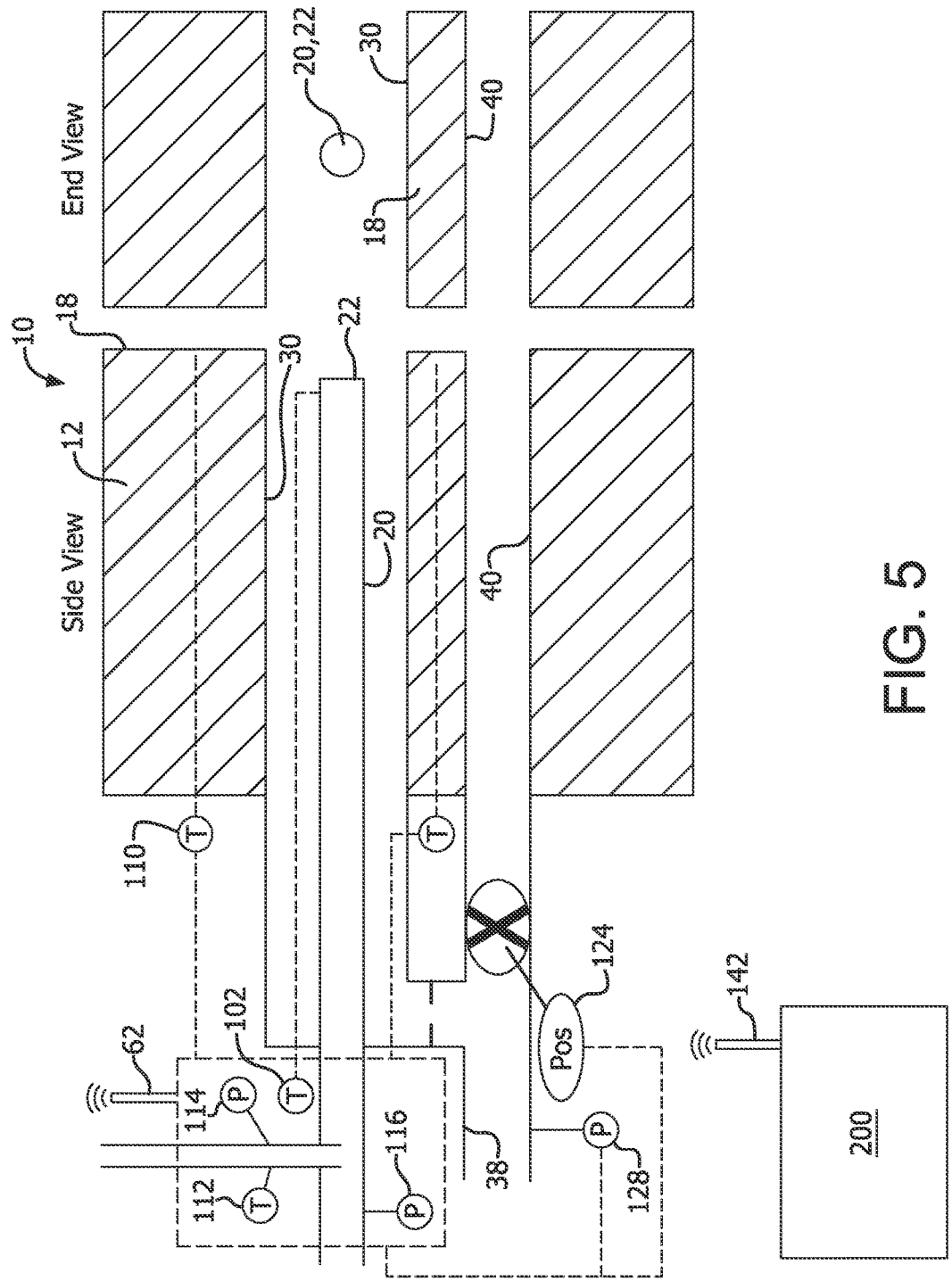
FIG. 5 is a cross-sectional view of an oxy-oil burner with monitoring inserted in a burner block.

In the embodiment of FIG. 5, a pressure sensor 116 is mounted in the atomizing gas stream near the atomizing gas inlet 28, and a pressure sensor 128 is mounted in the oxidant stream either near one of the oxidant inlets 38 or in the oxygen plenum 36 upstream of the staging valve 48. If desired, separate oxidant pressure sensors may be mounted in each of the primary oxidant conduit 32 and the secondary oxidant conduit 42 to detect the pressure of oxidant being supplied to each of the oxidant passages 30 and 40, respectively, in the burner block 12. The pressure sensors may be located inside or outside of the instrument enclosure 16, and are wired by cable for both power supply and signal transmission.

As shown, the instrument enclosure 16 includes a battery port 81 and a transmitter (antenna) 62 for wireless communication of data.

Note that similar configurations to the foregoing could be used to mount other sensors to monitor any of the feed streams.

In the depicted embodiment of FIGS. 1A to 5, the burner 10 also has a position sensor or rotation sensor 124 on the staging valve 48 to detect the percent staging. The rotation sensor 124 could be a Hall effect type sensor, accelerometer type sensor, a potentiometer, optical sensor, or any other sensor that can indicate rotational position. Additional position and angle sensors may be used to determine the position and/or angle of the burner body 14 relative to the furnace or the burner block 12, the position and/or angle of the lance 20 relative to the burner body 14 or the burner block 12, the insertion depth of the lance 20, and any other angles or positions that may be relevant to the operation of the burner 10.

For example, position sensors on the oil lance 20 can be used to detect and verify correct insertion depth and to log the information for tracking performance. Angle sensors on the burner 10 can be used to ensure that the burner is installed properly. This could be for ensuring that the burner is seated properly against the mounting plate for seating positive seal. In addition it is sometime desirable to install the burner at a given angle with respect to horizontal. Other sensors such as contact sensors between the burner and mounting plate could be used to ensure proper mounting of the burner to the mounting plate. By using one or more such sensors (preferably at least two) the burner can do a check on its installation to ensure that it is not ajar and is indeed in contact with both sensors (for example, a top sensor and a bottom sensor, or a left sensor and right sensor, or all four positions).

Additional connection ports may be located on the oil lance 20, the burner body 14, and/or the burner block 12 to enable additional external sensors or other signals to be connected to the data collector for transmission to a data indicator.

In one embodiment of the system of FIGS. 1A to 5 (or similarly the system of FIGS. 9 to 12), one or more burner components have a unique identifier. Specifically for a oil burner 10, the body 14 and each oil lance 20 may each have a unique identifier. This is useful since oil lances can be separated from the burner body and may be switched to different burner bodies. By incorporating a unique identifier on the burner body and lance, the communications equipment in the instrument box, which travels with the lance, can identify which burner body it is connected to for historical data archiving, trend analysis, and other reasons. This identifier could be RHO, a type of wireless transmitter, bar code, a one-wire silicon serial number, a unique resistor, a coded identifier, or any other identifying means.

Measuring the oil pressure can provide information about the flow resistance of the oil lance (e.g., decreased flow area due to coking or some other blockage will cause a pressure rise), the flowrate of the oil, and the viscosity of the oil (which is a function of temperature and composition). The oil pressure information is likely to be more useful when combined with other information (e.g., the oil temperature, the oil flowrate, the burner tip temperature, and data trending) in detecting maintenance needs of the oil lance.

Measuring the atomizing oxidant pressure also provides information about the oil flowrate and resistance and is therefore related to the oil pressure, but it is typically not the same and provides another element of information. Both of these instruments are located within the instrument box on the oil lance.

The oxygen pressure measurement provides information about the oxygen flowrate, flow resistance (i.e. blockage that may occur), and staging valve position.

Figure 1A:
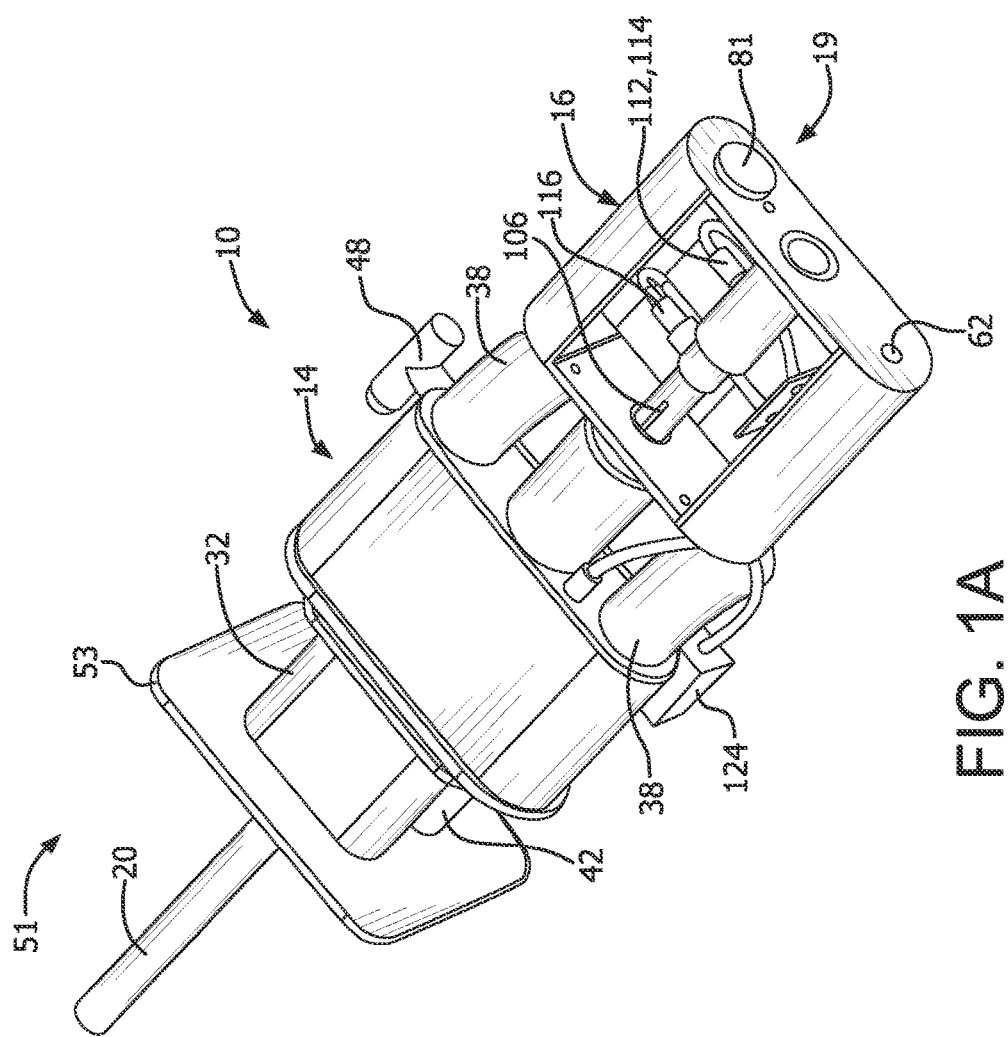
FIG. 1A is rear perspective view of an oxy-oil burner with monitoring for insertion into a burner block.
Figure 1B:
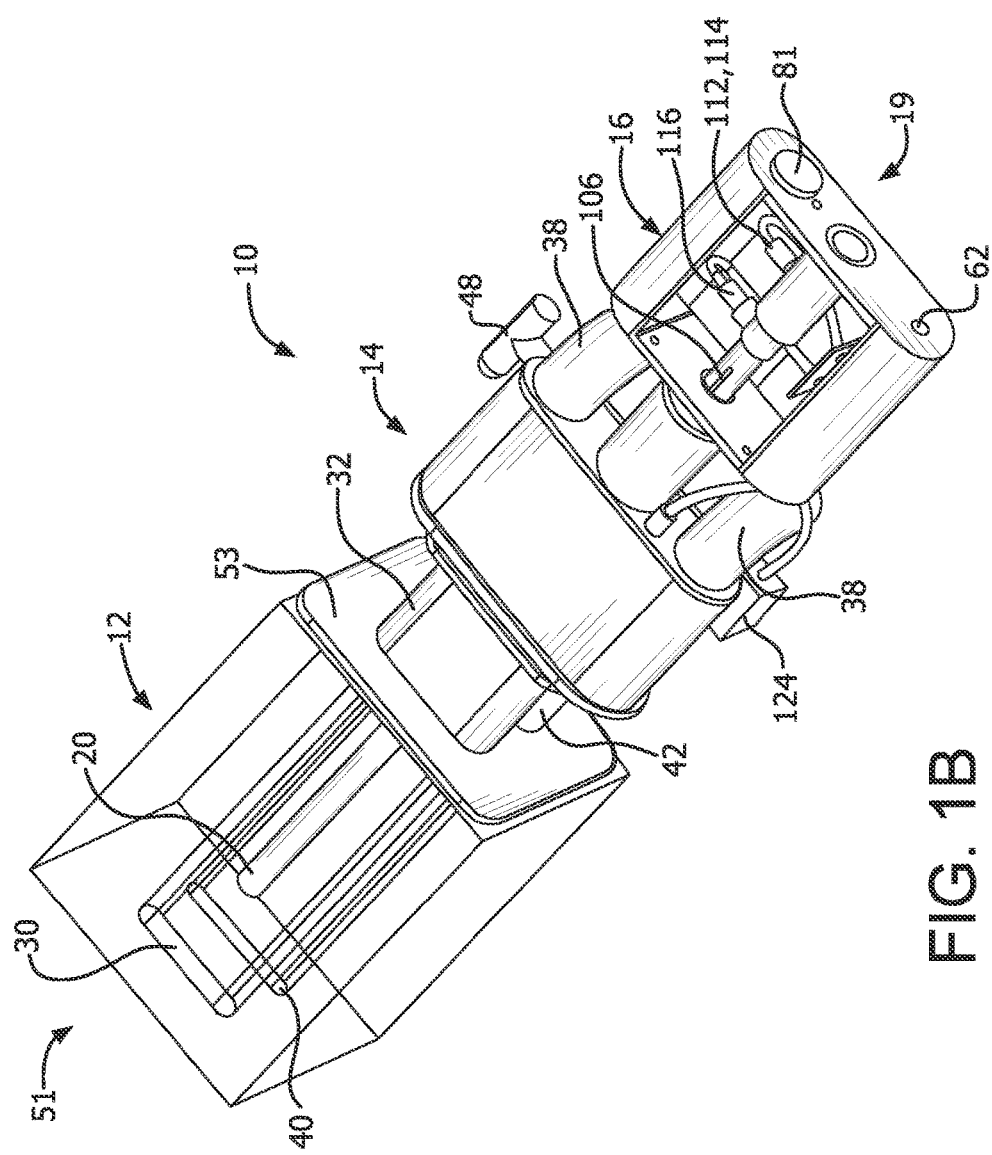
FIG. 1B is a rear perspective view of an oxy-oil burner with monitoring as in FIG. 1A inserted in a burner block.
Figure 2:
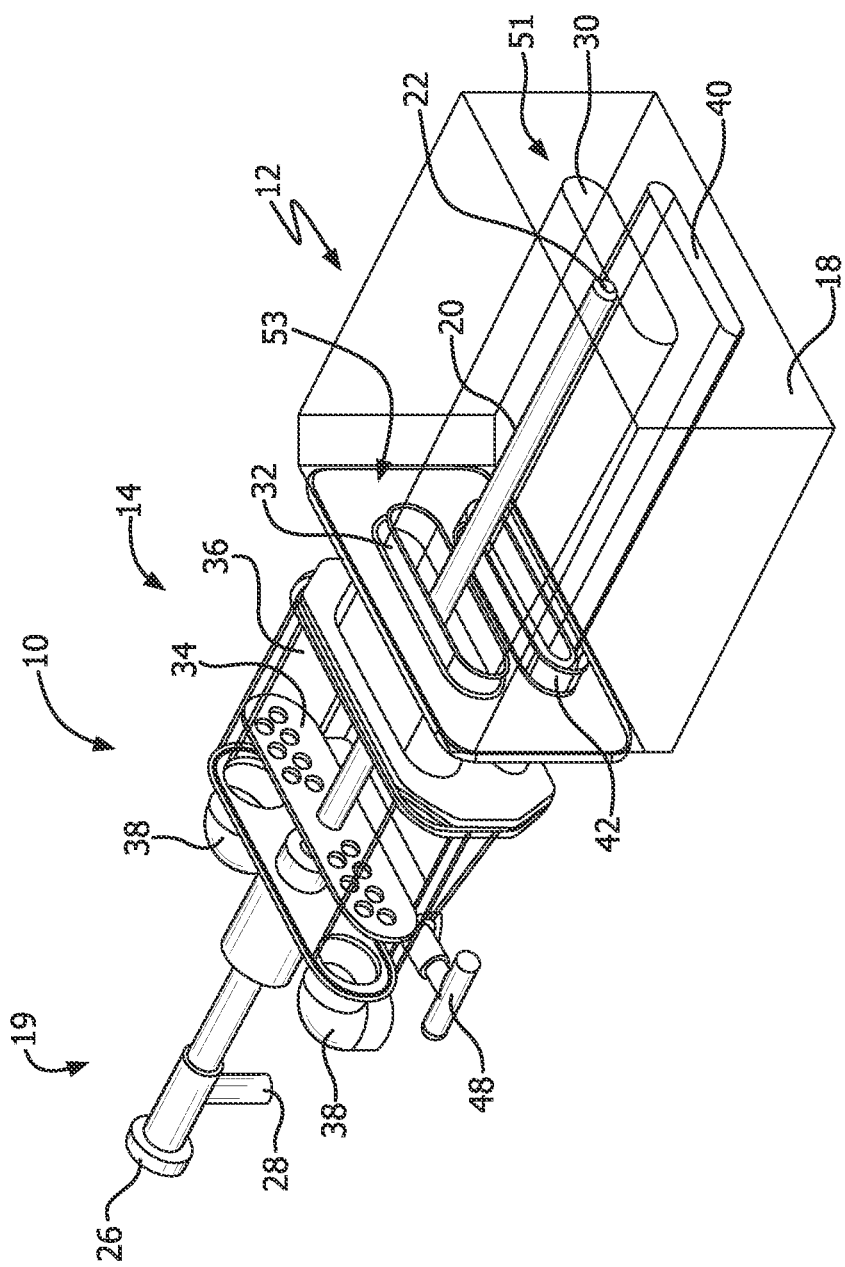
FIG. 2 is a front perspective view of an oxy-oil burner similar to the burner in FIG. 1A inserted in a burner block, but without monitoring capabilities.
Figure 3:
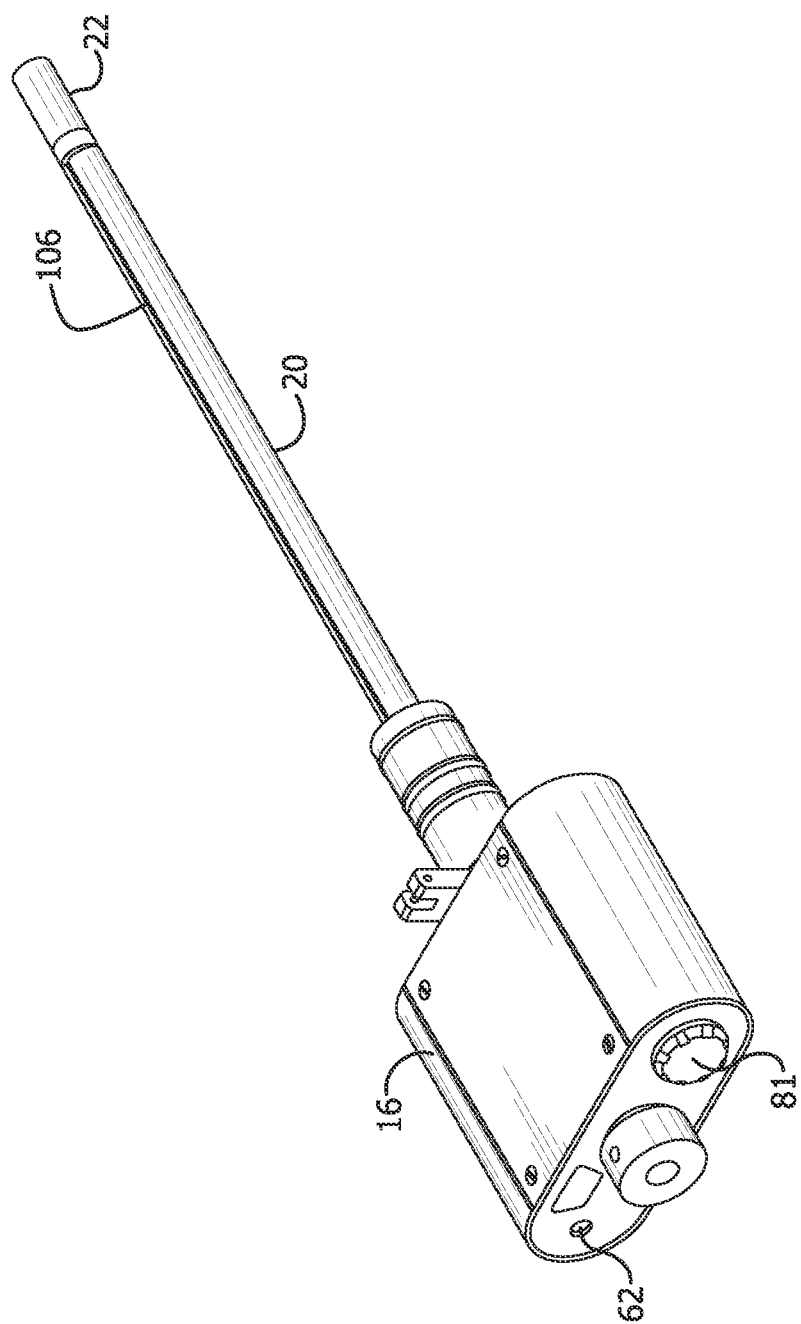
FIG. 3 is a rear perspective view of an oil lance for use in an oxy-oil burner with monitoring as in FIG. 1A.

The instrument enclosure 16, which is shown in partial cutaway in FIGS. 1A and 1B, is sealed and insulated to protect instrumentation contained therein from the dust and heat of a furnace environment. The instrument enclosure is positioned toward the rear 19 of the burner 10 to reduce the radiant heat energy received from the furnace. The instrument enclosure 16 includes at least a data collector 60, a power supply, and a transmitter 62 for sending data from the data collector to a data receiver 200 (which may collect and display data from multiple burners) located either locally or remotely. In one embodiment, the transmitter 62 is incorporated into the data collector 60. A data processor processes the data from all of the sensors and may be incorporated into the data collector 60 (e.g., data processor 66), located in the instrument enclosure 316 separately from the data collector 60 (e.g., data processor 166), or located at a remote location integral with or separate from the data receiver 200 (e.g., data processor 266).

In the embodiment depicted in FIGS. 9, 10, 11, and 12, the burner 310 has a discharge end 351 and an inlet end 319. For convenience of description, the discharge end 351 is sometimes referred to herein as the front or forward direction of the burner 310, while the inlet end 319 is sometimes referred to as the rear or rearward direction of the burner 310. When the burner 310 is mounted in a furnace, the discharge end 351 faces the interior of the furnace.

The burner 310 includes a burner block 312, a burner body 314 positioned rearward from burner block 312 with respect to the furnace, and an instrument enclosure 316 positioned rearward with respect to the burner body 314. The burner body 314 includes a mounting plate 353 that is secured to the burner block 312. The burner block 312 has a front face 318 that, when mounted, faces into the furnace.

The burner 310 includes a primary oxidant passage 330. In the depicted embodiment, the primary oxidant passage 330 has an elongated cross-sectional shape with a major axis (defining a width) longer than a minor axis (defining a height). In particular, the depicted primary oxidant passage 330 has the shape of a rectangle with semi-circular ends, and a width-to-height ratio from about 5 to about 30. However, in other embodiments, the primary oxidant passage 330 may have a circular, oval, ovalized rectangular, rectangular, or other shape. The primary oxidant passage has a primary oxidant nozzle 333 at its discharge end.

A fuel passage 320 is positioned within the primary oxidant passage 330 and has a fuel nozzle 322 at its discharge end. The fuel nozzle 322 is substantially surrounded by the primary oxidant nozzle 333 so that fuel discharged from the fuel nozzle 322 will mix intimately with the primary oxidant stream from the oxidant nozzle 333 upon discharge. In the depicted embodiment, the fuel passage 320 has an elongated cross-sectional shape with a major axis (defining a width) longer than a minor axis (defining a height). In particular, the depicted fuel passage 320 has the shape of a rectangle with semi-circular ends, and a width-to-height ratio from about 5 to about 30. However, in other embodiments, the fuel passage 320 may have a circular, oval, ovalized rectangular, rectangular, or other shape. In the depicted embodiment, the fuel passage 320 is substantially centrally positioned within the primary oxidant passage 330, although it is understood that the fuel passage 320 may be located in a non-central location provided the fuel nozzle 322 is adapted to distribute the fuel to be adequately mixed with the primary oxidant stream for combustion. Preferably, but not necessarily, the fuel passage 320 approximately the same shape as the primary oxidant passage 330.

The burner 310 further includes a secondary oxidant passage 340 spaced apart by a fixed distance from the primary oxidant passage 330. In the depicted embodiment, the secondary oxidant passage 340 has an elongated cross-sectional shape with a major axis (defining a width) longer than a minor axis (defining a height), similar to the primary oxidant passage 330. In particular, the depicted seconder oxidant passage 340 has the shape of a rectangle with semi-circular ends, and a width-to-height ratio from about 5 to about 30, which may be the same as or different from the width-to-height ratio of the primary oxidant passage 330. The major axis of the secondary oxidant passage 340 is substantially parallel to the major axis of the primary oxidant passage 330. However, in other embodiments, the second oxidant passage 340 may have a circular, oval, ovalized rectangular, rectangular, or other shape, and preferably but not necessarily approximately the same shape as the primary oxidant passage 330.

The primary oxidant passage 330 is fed oxidant from a primary oxidant conduit 332 positioned in the burner body 314 and extending into a rear portion of the burner block 312. Oxidant is fed through a pair of oxidant inlets 338 into an oxidant plenum 335 that in turn feeds the primary oxidant conduit 332. A diffuser 334 may be positioned between the oxidant inlets 338 and the oxidant plenum 335 to aid in straightening out the primary oxidant flow prior to entering the primary oxidant conduit 332.

The secondary oxidant passage 340 is fed oxidant from a secondary oxidant conduit 342 positioned in the burner body 314 and extending into a rear portion of the burner block 312. A staging valve 348 in the burner body 314 redirects a portion of the oxidant supplied by the oxidant inlets 338 into the secondary oxidant conduit 342. The term "staging ratio" is used to describe the proportion of oxidant that is redirected to the secondary oxidant conduit 342, and thus away from the primary oxidant conduit 332. For example, at a staging ratio of 30%, 70% of the oxidant is directed to the primary oxidant conduit 332 (and thus to the primary oxidant passage 330) as a primary oxidant stream and 30% of the oxidant is directed to the secondary oxidant conduit 342 (and thus to the secondary oxidant passage 340) as a secondary oxidant stream.

The oxidant gas fed to the oxidant inlets 338 may be any oxidant gas suitable for combustion, including air, oxygen-enriched air, and industrial grade oxygen. The oxidant preferably has a molecular oxygen ($O_2$) content of at least about 23 mol %, at least about 30 mol %, at least about 70 mol %, or at least about 98 mol %.

The fuel passage 320 extends rearward through the burner body 314 and through the instrument enclosure 316. Fuel is supplied to the fuel passage 320 through a fuel inlet 326.

Although the embodiment described herein stages oxidant flow and includes a primary oxidant passage 330, a secondary oxidant passage 340, and a fuel passage 320, an analogous burner have an analogous physical structure can be used which stages fuel flow and includes a primary fuel passage, a secondary fuel passage, and an oxidant passage. More generically, a burner can be described as combusting a first reactant (which is one of a fuel and an oxidant) and a second reactant (which is the other of a fuel and an oxidant), the burner including a primary first reactant passage, a secondary first reactant passage, and a second reactant passage.

Various sensors may be used for monitoring parameters of burner components. In the depicted embodiment of FIGS. 9, 10, 11, and 12, various sensors are shown for monitoring and controlling burner operation.

Temperature sensors may be placed on or in the burner 310 itself or on components of the burner 310, or in other portions of the furnace. For example, temperature sensors on the burner 310 can monitor operational parameters such as burner integrity, flame stability, flame position, while temperature sensors in the furnace can measure the temperature of the charge before, during, and after firing of the burner to provide information about the rate of heat transfer and distribution of heat from the burner. The sensors may be of any type, including without limitation thermocouples and optical (e.g., infrared) sensors.

Figure 11:
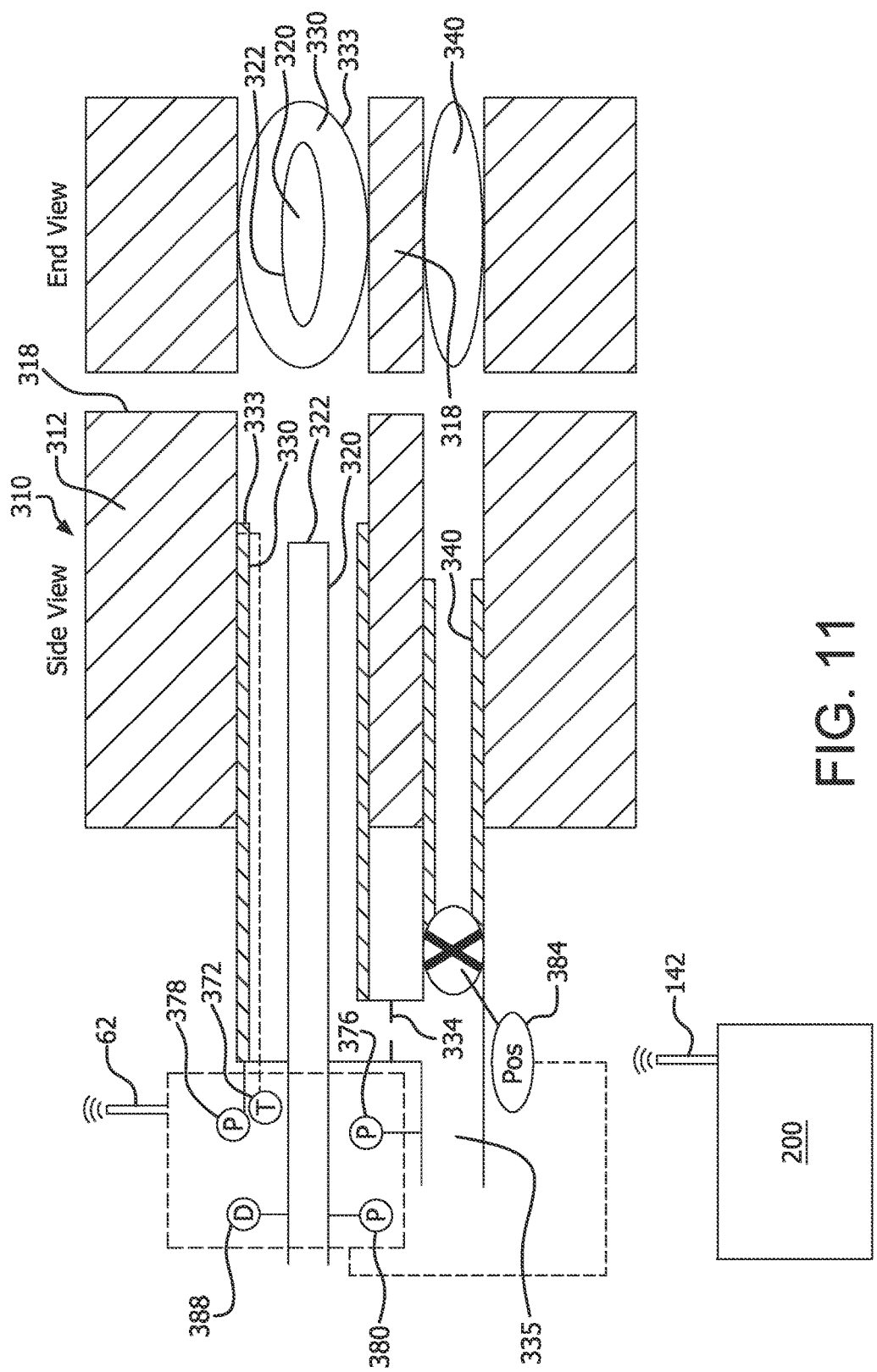
FIG. 11 is a cross-sectional view of an oxy-gas burner with monitoring inserted in a burner block.

In the depicted embodiment of FIG. 11, a temperature sensor 372 is mounted in the primary oxidant passage 330 at or near the oxidant nozzle 333 for monitoring the temperature of the primary oxidant passage 330 or the oxidant nozzle 333. Alternatively, or in combination with the oxidant sensor, a temperature sensor 372 could mounted in the fuel passage 320 at or near the fuel nozzle 322 for monitoring the temperature of the fuel passage 320 or the fuel nozzle 322. In other embodiments, temperature sensors may be mounted in the burner block 312 near the front face 318 or near the flow passages. The connection points to two temperature sensors 372 are shown in FIG. 10. When mounted in the burner face 318, the temperature sensors 372 are preferably set back slightly from the front face 318 to protect them from the furnace environment. The temperature sensors 372 may be centered with respect to the primary oxidant passage 330 or the fuel passage 320, or offset from the minor axis centerline and may be used to determine whether the flame is impinging on the burner block 312 or whether the flame is centered about the fuel passage 320 or the primary oxidant passage 330. Temperature sensors may even be positioned in other locations of the furnace proximate to the burner for monitoring combustion conditions. Optical sensors may also, or alternatively, be used to monitor the light intensity from the block, with increased emissions from the block indicating potential flame impingement.

In the depicted embodiment of FIGS. 11 and 12, pressure sensors are installed in the burner 310. A pressure sensor 380 is positioned in the fuel passage 320 for measuring the fuel pressure upstream of the fuel nozzle 322. Another pressure sensor 376 is mounted in the oxidant stream either near one of the oxidant inlets 338, or in the oxygen plenum 335 upstream of the staging valve 348 to measure the oxidant pressure upstream of the staging valve, or upstream of the diffuser 334 to measure oxidant inlet pressure upstream of the diffuser 334. If desired, separate oxidant pressure sensors may be mounted in each of the primary oxidant conduit 332 (pressure sensor 378) and/or in the secondary oxidant conduit 342 (pressure sensor 379) to measure the pressure of oxidant being supplied to either or both of the oxidant passages 330 and 340 in the burner block 312. The pressure sensors 378 and 379 are located downstream of the diffuser 334, and one or both may be used in combination with the pressure sensor 376 to determine flow rate based on pressure drop across the diffuser 334. The pressure sensors may be located inside or outside of the instrument enclosure 316, and are wired by cable for both power supply and signal transmission. The burner 310 may further include a density sensor 388, for example as described in US Patent Pub. No. 2014/0000342, that is mounted in the fuel passage 320 (as shown) and/or in the primary oxidant passage 330 (not shown).

Figures 17A, 17B:
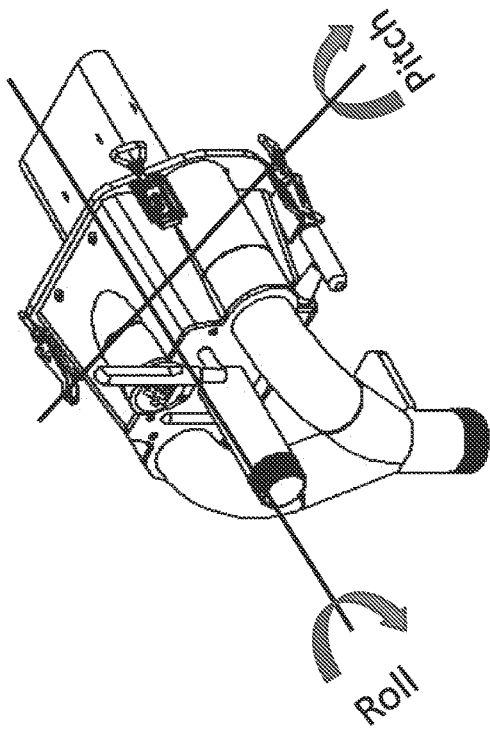
FIG. 17A shows the pitch (angular deviation about an axis perpendicular to a longitudinal burner axis) and roll (angular deviation about an axis coincident with the longitudinal burner axis)
FIG. 17B shows the effect of pitch and roll on flame impingement at the burner face, where pitch and roll are normalized to zero for operation with no flame impingement.

As shown, the instrument enclosure 316 includes a battery port 382 for housing a local power supply (e.g., a battery) to provide power to the components in the instrument enclosure 116, as well as to the various sensors. The instrument enclosure 316 further includes a transmitter (antenna) 62 for wireless communication of data. The enclosure 316 also includes a position and angle sensing apparatus 370 measuring angles as shown in FIG. 17A and discussed in further detail below. Such position and angle sensors may be used to determine the position and/or angle of the burner body 314 relative to the furnace or the burner block 312 and any other angles or positions that may be relevant to the operation of the burner 310. Additionally, the burner 310 also has a position sensor or rotation sensor 384 on the staging valve 348 to detect the percent staging. The rotation sensor 384 could be a Hall effect type sensor, accelerometer type sensor, a potentiometer, optical sensor, or any other sensor that can indicate rotational position. The instrument enclosure 316 may also include an LED 386 or other light source for illuminating the internals of the burner 310, and/or for indicating burner operating status.

The oxygen pressure measurements provides information about the oxygen flowrate, flow resistance (i.e., potential blockage that may occur), and staging valve position. The fuel pressure measurement provides information about fuel flowrate and flow resistance (i.e., potential blockage that may occur). Interpretation and use of data relating to these sensors is discussed in further detail below, In the depicted embodiment of FIGS. 9 to 12, the burner 310 also has a position sensor or rotation sensor 384 on the staging valve 348 to detect the percent staging. The rotation sensor 384 could be a Hall effect type sensor, accelerometer type sensor, a potentiometer, optical sensor, or any other sensor that can indicate rotational position. Additional position and angle sensors may be used to determine the position and/or angle of the burner body 314 relative to the furnace or the burner block 312, and any other angles or positions that may he relevant to the operation of the burner 310.

The instrument enclosure 316 is similar to the instrument enclosure 16 discussed above, and is sealed and insulated to protect instrumentation contained therein from the dust and heat of a furnace environment. The instrument enclosure is positioned toward the rear 319 of the burner 310 to reduce the radiant heat energy received from the furnace. The instrument enclosure 316 includes at least a data collector 60, a power supply, and a transmitter 62 for sending data from the data collector to a data receiver 200 (which may collect and display data from multiple burners) located either locally or remotely. A data processor processes the data from all of the sensors and may be incorporated into the data collector 60 (e.g., data processor 66), located in the instrument enclosure 316 separately from the data collector 60 (e.g., data processor 166), or located at a remote location integral with or separate from the data receiver 200 (e.g., data processor 266).

The power supply is used to power the pressure sensors, the data collector, and the transmitter, and any other sensors and equipment requiring power. Preferably, the power supply is powered by a local battery that may or may not be charged via local energy harvesting or power generation to avoid having to wire outside power to the instrument enclosure 316. For example, local power generation may include using temperature gradients, mass flow, light, induction, or other means to generate sufficient power to support the sensors and other associated equipment in the instrument enclosure 316.

Figure 8:
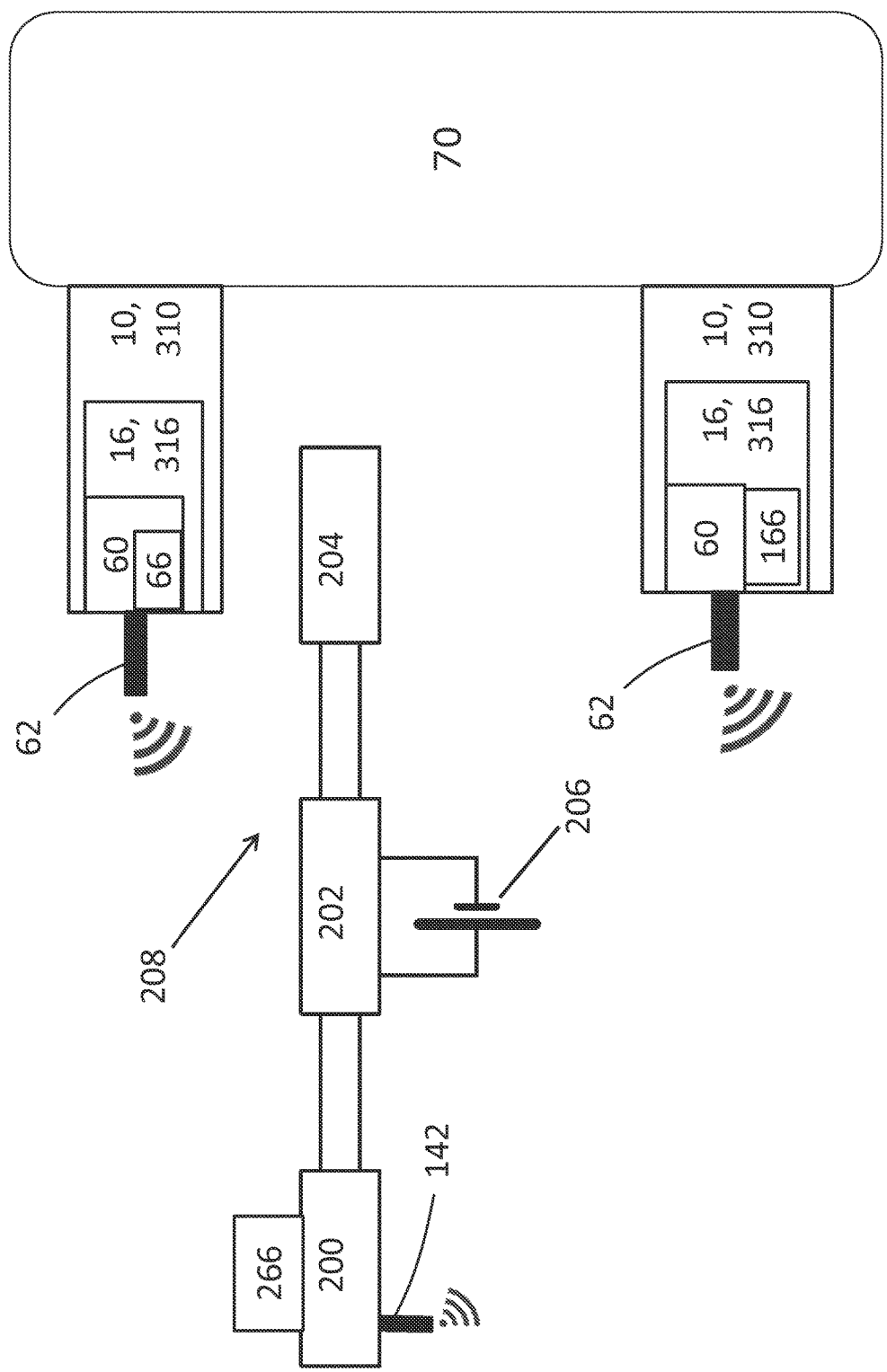
FIG. 8 is a schematic showing components of a communication system for collecting, transmitting, and analyzing data collected from various sensors on a burner, and for providing local power generation to a data center.

FIG. 8 is a schematic of an exemplary system for handling the burner data, it being understood that various alternative combinations of hardware, firmware, and software could be configured and assembled to accomplish the same functions. One or more burners 10, 310 may be mounted in the furnace, each burner 10, 310 having an instrument enclosure 16, 316, respectively, as described above. In the schematic of FIG. 8, multiple burners 10, 310 are mounted in the furnace. Each instrument enclosure 16, 316 contains a data collector 60 for collecting and aggregating the data generated by each of the sensors on the burner 10, and a wireless transmitter 62 for transmitting the data from the data collector 60, as well as other components such as a power supply (not shown). The data collector 60 is programmable via one or more of hardware, firmware, and software, independently or in combination, to perform application-specific functions. The data collector 60 may include an integral data processor 66, or a separate data processor 166 may be located in the instrument enclosure 16, 316.

In an exemplary embodiment, the data collector 60 at each burner 10, 310 aggregates data for that burner 10, 310 using a highly configurable Wireless Intelligent sensor Node (WIN). The data collector 60 powers the various sensors associated with the burner 10, and is programmed to convert a battery voltage of between 3.2V and 6V, for example to the correct voltage required by each sensor (e.g., 12V). The battery voltage can be supplied by locally mounted batteries that are replaceable or that are charged by local power generation. In one embodiment, the sensors transmit analog output signals that are read via an analog-to-digital converter with a programmable gain amplifier to take into account the output range of each sensor. In another embodiment, the sensors transmit digital output signals that are scaled, or that may be scaled, based on the output range of each sensor.

The data collector 60 is also capable of reading digital sensors or indicators such as a serial number. An internal temperature sensor allows monitoring of the ambient temperature and thus cold junction compensation of thermocouples. An internal accelerometer allows the attitude of the node (and therefore what it is attached to) to be measured. Advanced power management is used to maximize battery life. In particular, the data collector 60 is programmed to power the sensors when measurements are to be taken, either based on a combination of sensed conditions or on a regular schedule.

The sensor measurements are consolidated, taking into account the gain of the amplifier taken, cold junction compensation, and any other relevant factors, and transmitted to a data receiving/processing center 200, preferably via a wireless link. In an exemplary embodiment, the wireless link uses the 2.4 GHz ISM band and the 802.15.4 standard as its physical layer and Medium Access Control (MAC). However, any other wireless link now known or later developed that is suitable for the operating environment could be used. The protocol uses a star network topology. Alternative frequencies and protocols are possible, including without limitation mesh network topologies. The 2.4 GHz band was chosen since it is a worldwide ISM band while most other ISM bands are country specific. The wireless link to the node is bidirectional to allow configuration of the node over the air. The data may be encrypted prior to transmission for security purposes. The data may be transmitted directly from the data collector 60 to the data center 200, or indirectly via one or more Wi-Fi or other repeaters depending on the distance and signal path between the burner 10, 310 and the data center 200.

The data center 200 is configured to receive data from the individual burners 10, 310, and may also be configured to transmit data to a cloud-based server which can then serve data, provide alerts, and perform any other computational function via the Internet or other network. The data center 200 may be a single piece of hardware or multiple cooperating pieces of hardware configured and programmed to perform all of the desired functions described herein. The data center 200 may also include a data display (not shown) either at the burner or nearby using an accompanying piece of hardware that has a display module. The data center 200 may include, or may be connected to, a data processor 266.

Electrical power may be supplied to the data collector 60 by a local power generation system. FIG. 8 shows an exemplary local power generation system 208 to provide electrical power to the data center 200. Note that a similar arrangement may also be employed to provide locally generated electrical power to the data collector 60. In the depicted embodiment, the local power generation system 208 includes a rechargeable battery 206 or super capacitor, and an energy harvester 204. The rechargeable battery 206 may include, for example, one or more lithium on batteries or the like. Charging and discharging of the battery 206 is controlled by a battery supervisor 202, which is positioned as a hub between the data center 200, the battery 206, and the energy harvester 204. The battery supervisor 202 can be configured to perform various functions, including but not limited to one or more of the following, alone or in combination: conditioning power flowing to and from the battery 206 and the energy harvester 204, maximum power point tracking to maximize harvested energy efficiency from the energy harvester 204, and permitting the data collector 60 to turn on only when there is sufficient energy available in the battery 206. Local power generation systems 208 as described herein may be used to respectively power one or more data centers 200, and/or individual data collectors 60 located at each burner 10, 310 and/or one local power generation system may power one or more nearby data collectors 60. These local power generation systems can operate to store power during periods of low usage and release power during periods of high usage, thereby minimizing the required capacity of the energy harvester. In addition, similar local power generation systems 208 can be used to power one or more data centers 200.

Advanced power management helps ensure long-term operation of the system on limited battery or locally generated power supply. Power is supplied to a Wireless Intelligent sensor Node (WIN) that is highly configurable to provide the correct required voltage to each of the different sensors. Moreover, the WIN intelligently turns off power to individual sensors when they are not in use, collects data from the sensors when in use, and transmits the data at configurable time intervals. An indicator light shows the status of the system and also provides alerts. By powering the sensors only when they are used (e.g., on a predetermined time rotation to obtain periodic measurements), this conserves power from the power supply. However, it has been determined that some sensors, including but not limited to pressure sensors, may not give reliable data immediately after being powered up and do not respond well to being powered for only brief amounts of time. Therefore, the system requires both careful selection of sensors and specific configuration of the WIN to match the power up and power down cycles with the operating requirements of each sensor.

The data collector 60 receives signals from all the sensors, and the transmitter 62 sends the collected signal data to a data indicator where a user can view the status of the various parameters being measured. The data collector 60 may also include a data processor 66 or 166, or may send the collected signal data via the transmitter to a separate data processor 266.

Measuring the various temperatures, pressures, and positions of the burner and its components and feed streams and inputs from the other associated equipment including flow control skids, separately and in combination, can provide valuable information that enables an operator to perform preventive maintenance only when needed and to avoid costly unexpected failures or shutdowns. In one embodiment, position sensors can include GPS or other local triangulation position indicators to determine the installation location of a burner and/or its components. Alternatively, and any presently known or newly developed method may be used to determine location.

Figure 20:
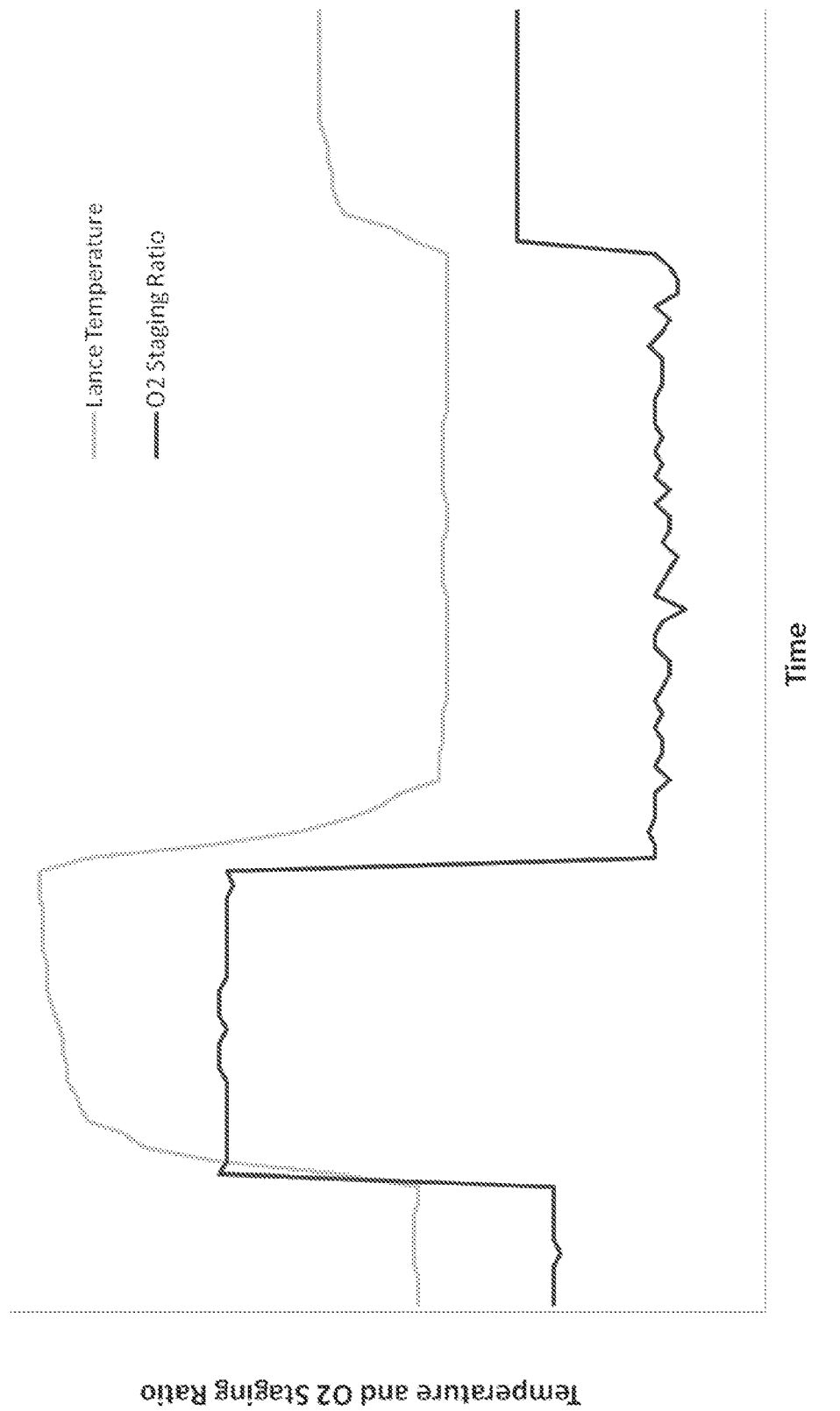
FIG. 20 is a graph illustrating fuel oil lance tip temperature for an oxy-oil burner as in FIG. 1A at several different oxygen staging ratios.

In one example of an oxy-oil burner, high oil tip temperature along with higher than expected oil pressure and atomizing gas pressure may indicate that the oil nozzle is clogged or is starting to clog. This alerts an operator that maintenance should be performed soon so that the tip does not burn up in hot furnace. As shown in FIG. 19, the tip temperature may indicate a need for nozzle cleaning better than pressures alone. In the illustrated example, oil pressure and atomizing air pressure are monitored in addition to the tip temperature before and after nozzle cleaning. While the tip temperature increases fairly uniformly, the pressure changes are not as clear with time, thereby making it more difficult to determine the need for oil nozzle cleaning based on pressures alone. After cleaning of the oil nozzle the tip temperature drops dramatically and the pressures change as well. However relying on tip temperature alone may not be reliable since there are other factors that affect tip temperature in addition to lance nozzle lifetime. For example, FIG. 20 shows the results of monitoring lance tip temperature while changing the oxygen staging level for an oxy-oil burner. Here the direct correlation between the staging level and the tip temperature is apparent. Therefore multiple pieces of information are preferred for a reliable interpretation of the data. By combining the staging level, lance history, pressures, and temperatures, it is possible accurately determine when the oil nozzle needs to be cleaned.

The lance or fuel nozzle tip temperature may also be an indicator of combustion stability or the proximity of the flame root to the burner. However, as noted above, a knowledge of other burner conditions is important to accurately interpret the possible cause of a change in fuel nozzle temperature.

The difference between the oil inlet pressure and atomizing gas inlet pressure can provide an estimate of the expected firing rate, since for a given firing rate, there would be an expected pressure difference between the oil and atomizing gas. However, this estimate of firing rate may be affected by clogging as seen in FIG. 19. Alternatively, or in combination with measuring the difference between the oil and atomizing gas pressures, the oxygen inlet pressure and staging valve position can be used to calculate the firing rate based on an assumed stoichiometry, and this measurement is not typically affected by oil nozzle clogging. So for any firing rate, if the pressure difference between the oil and atomizing gas is more than expected (taking into account the oil viscosity based on the measured oil temperature and known or assumed composition), this is an indication that some clogging is occurring and maintenance is needed.

Figure 6:
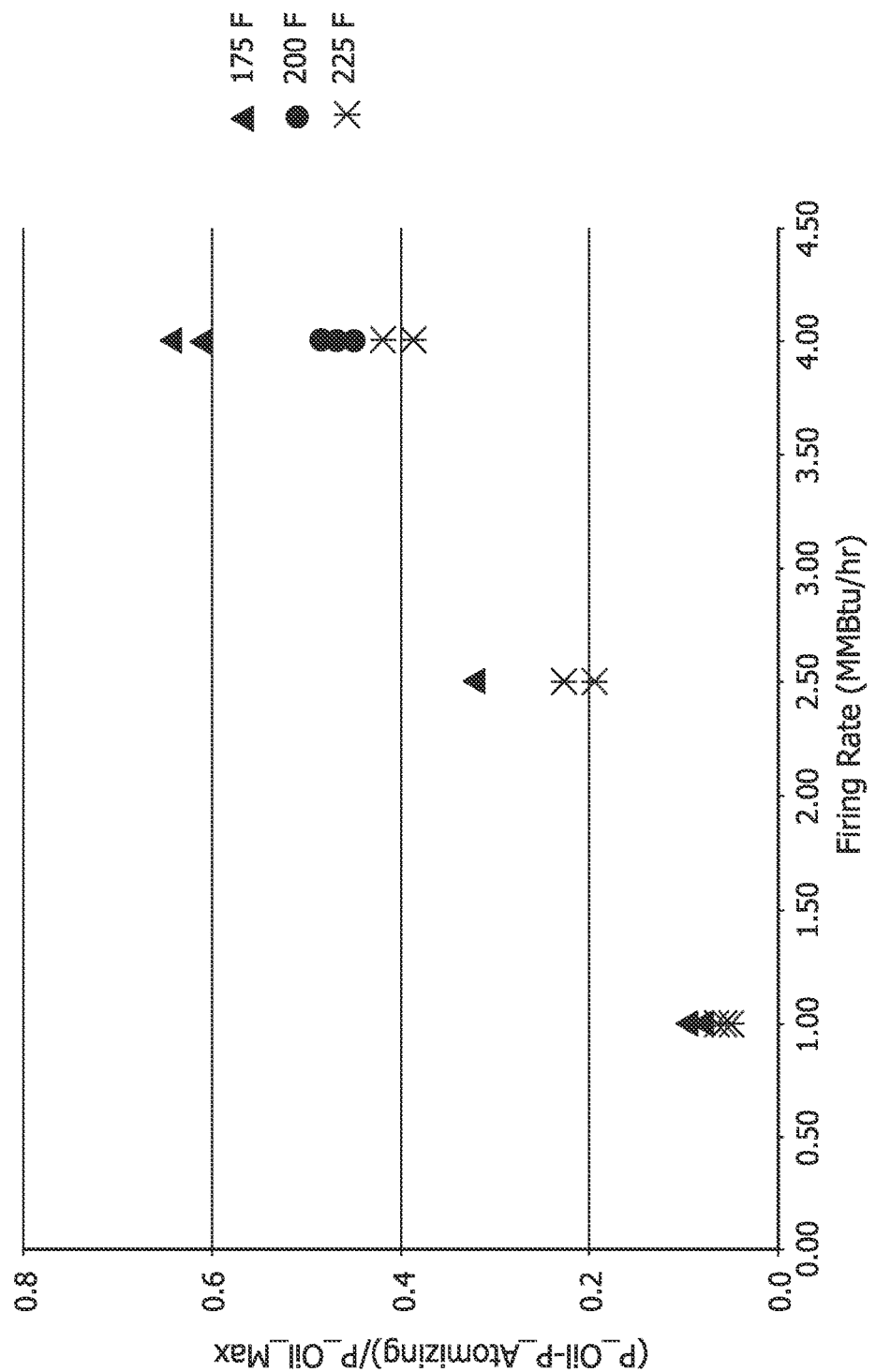
FIG. 6 is a graph showing exemplary pressure data comparing the difference between the oil inlet pressure and the atomizing gas inlet pressure for a fuel oil at different temperatures.

FIG. 6 compares the pressure difference between the oil inlet and the atomizing gas inlet pressures as a function of firing rate for a known composition of fuel oil at three different oil temperatures. In all cases, the atomizing nozzle was clean and unobstructed. As can be seen from the data, the pressure difference is greater at all firing rates for the lower temperature oil, with the pressure difference becoming larger in both absolute and relative terms at the higher firing rates. Testing has shown that this pressure difference is a much better indicator of the health of the atomizing nozzle than the oil inlet pressure alone.

Figure 7:
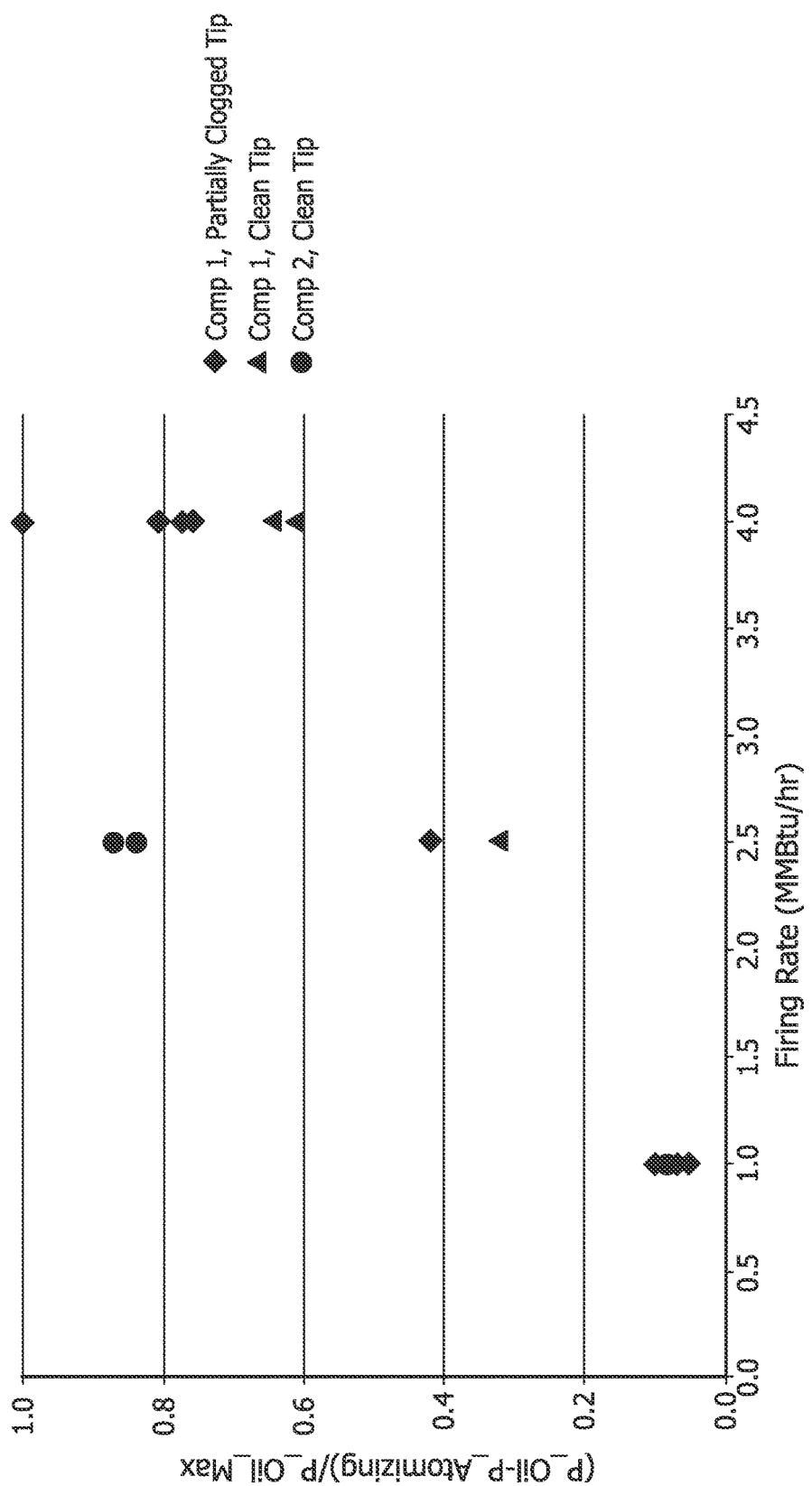
FIG. 7 is a graph showing exemplary pressure data comparing the difference between the oil inlet pressure and the atomizing gas inlet pressure for two fuel oil compositions and showing differences for one of those fuel oil compositions when the nozzle tip is partially clogged, and when a temperature excursion occurred.

FIG. 7, on the same axes as FIG. 6, compares three situations at 175° F.: the triangular data points represent a first fuel and are the same data as the triangular data points on FIG. 6; the circular data points represent a second fuel having a more viscous composition at the same temperature conditions with a clean atomizing nozzle; and the diamond data points represent the first fuel but flowing through a partially obstructed atomizing nozzle. It can clearly be seen that the second fuel, due to its higher viscosity, exhibits a significantly higher pressure difference (between the oil inlet pressure and the atomizing gas pressure) than the lower viscosity first fuel, and that the pressure difference rises significantly when the atomizing nozzle is partially obstructed or dogged. Additionally, the diamond shaped data point in the top right of the graph occurred during a temperature excursion of the atomizing nozzle when the temperature had unexpectedly changed, thereby showing that multivariable monitoring that takes into account secondary effects can also be useful as an internal check on the proper operation of all of the sensors and the system.

Further, using any estimate of firing rate (however determined) provides an expected oil pressure. If the oil pressure is higher than the expected oil pressure then either some clogging is occurring or the oil viscosity is lower than expected. A higher than expected oil pressure combined with the oil inlet temperature would help determine whether the oil viscosity is low or if the oil nozzle is partially blocked.

If the oil pressure is as expected and the inlet oil temperature is as expected, than a higher tip temperature may indicate that the tip is inserted farther than design or that the flame is not where it is expected to be (see below for an example). Therefore, it is clear that there is a complex interplay between the various measured parameters to ascertain, for example, the reason for an elevated tip temperature or a lower than expected oil pressure or a higher than expected oil pressure. Note that, in addition to comparing these parameters on each burner, for example versus historical or predicted data, these parameters can also be compared across burners to detect abnormal operation of one of the burners and can be combined with other plant data. This determination can include a multi-variable analysis, for example as described in "A New Paradigm in Real Time Asset Monitoring and Fault Diagnosis," Neogi, D., et al., 2013 AIChE Annual Meeting, Conference Proceedings Presentation No. 268b (Nov. 5, 2013).

Figure 15:
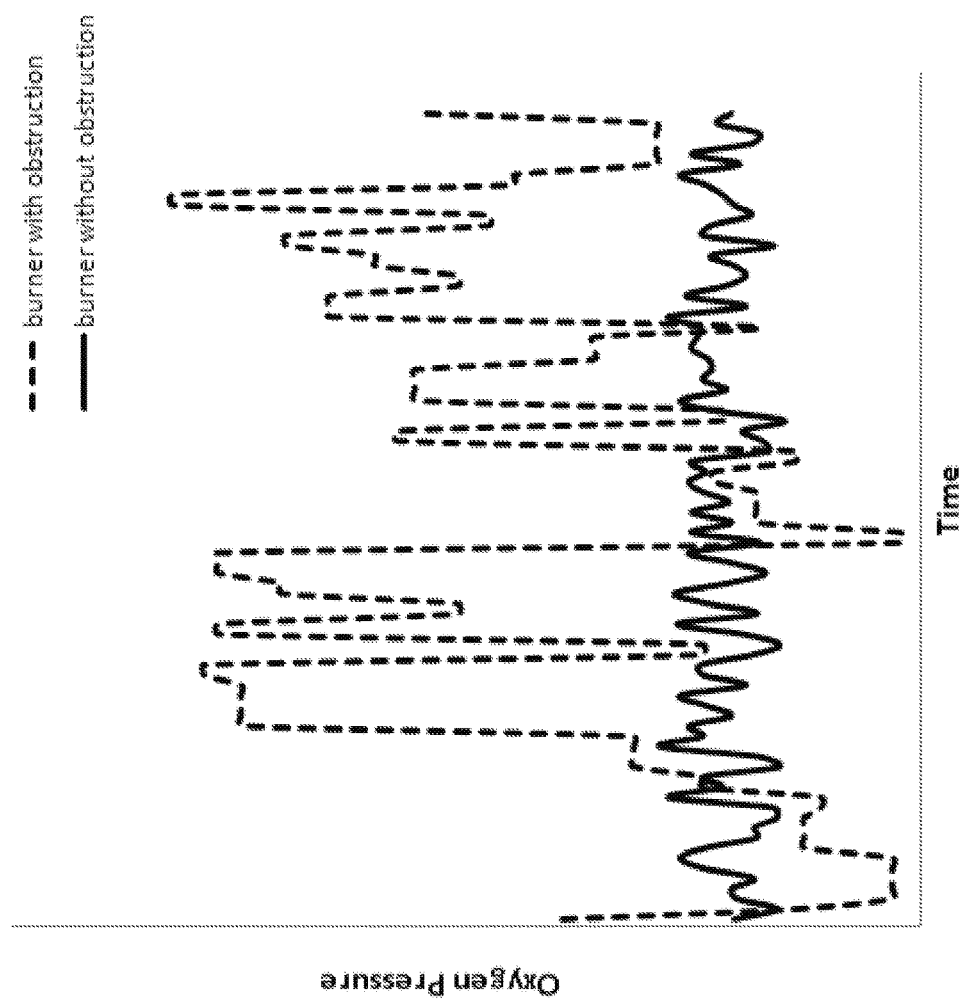
FIG. 15 is a graph comparing oxygen pressure fluctuations in the same burner with and without an obstruction placed at the burner outlet.

In another example, a higher than expected oxidant pressure or increased fluctuations in pressure may indicate a decrease in the oxidant flow area in the burner block. For example, FIG. 15 shows data for oxidant pressure with and without an obstruction, and indicates that the pressure fluctuations with an obstruction are about 2 to about 6 times the magnitude of the pressure fluctuations without an obstruction. In addition, the average oxygen pressure is also higher with an obstruction than without.

Figure 16:
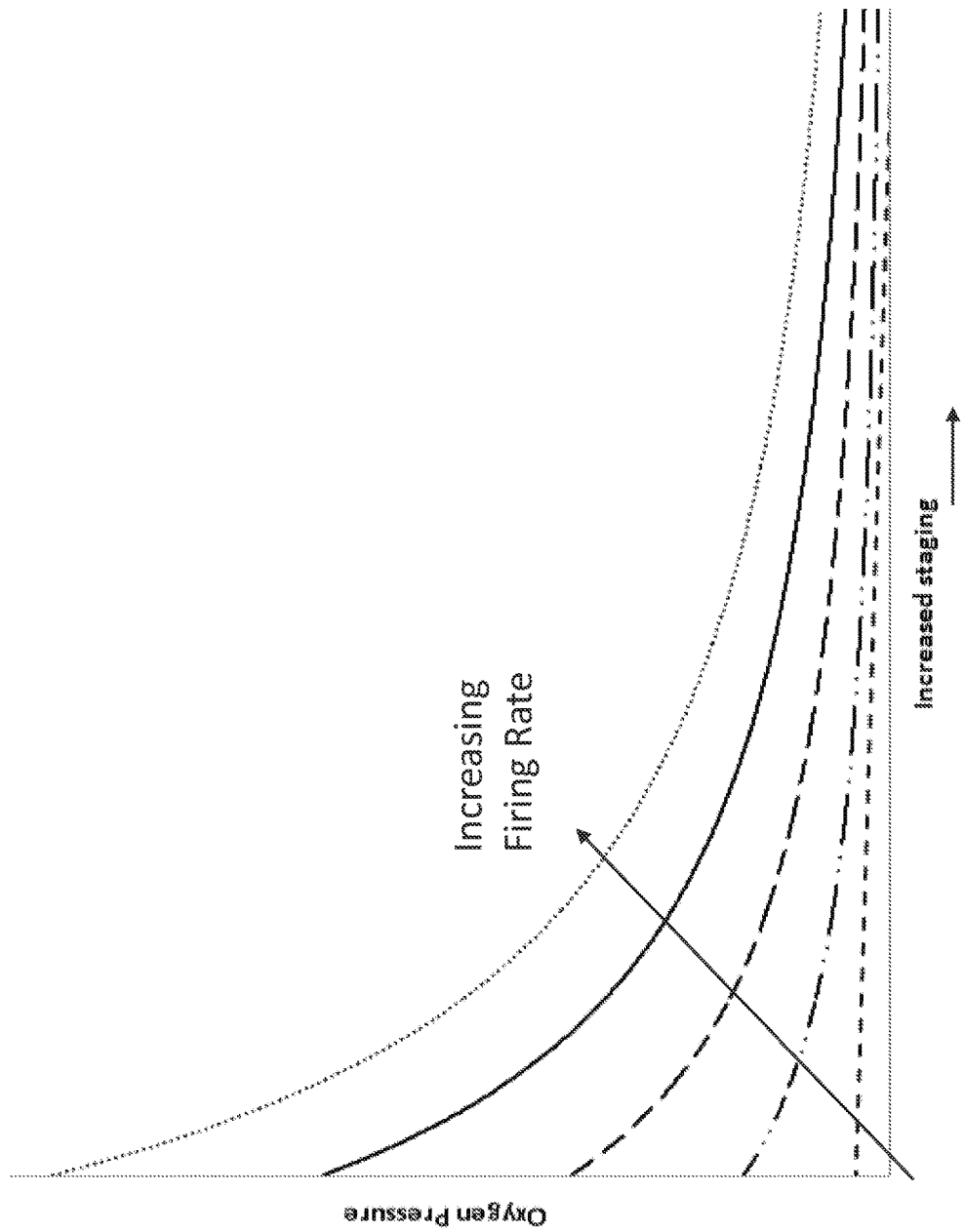
FIG. 16 is a graph illustrating the variations in oxygen pressure as a function of firing rate and staging ratio.

The expected oxidant pressure can be determined by other measured variables including flow control skid data. The oxidant pressure is a function of oxidant flow (or to a first approximation, firing rate for a known stoichiometry) and staging valve position as shown in FIG. 16. By estimating the oxidant flow based on the measured oil pressure (assuming a clean oil nozzle) or natural gas pressure or from the method described above, there is an expected oxidant pressure based on the staging valve position. To more accurately determine the expected oxidant pressure, it may be useful to also determine the oxidant flow rate, for example via an oxidant flowmeter or to infer the oxidant flow rate using the burner firing rate (which may be determined using previously described methods) and stoichiometry or by measuring the pressure drop across a known flow restriction device (diffuser 334) as shown in FIG. 11.

If the oxidant pressure is higher than the expected oxidant pressure, that could indicate that the flow area of the oxidant is decreased either due to blockage of the burner block openings or some other opening. The burner block openings may be partially blocked by run down on the block face, slag, or other material that may have splashed or dripped onto the burner block. If such partial blockage occurs undetected, it may lead to failure of the burner and/or burner block, so it is important to detect before such failure occurs.

Figure 14:
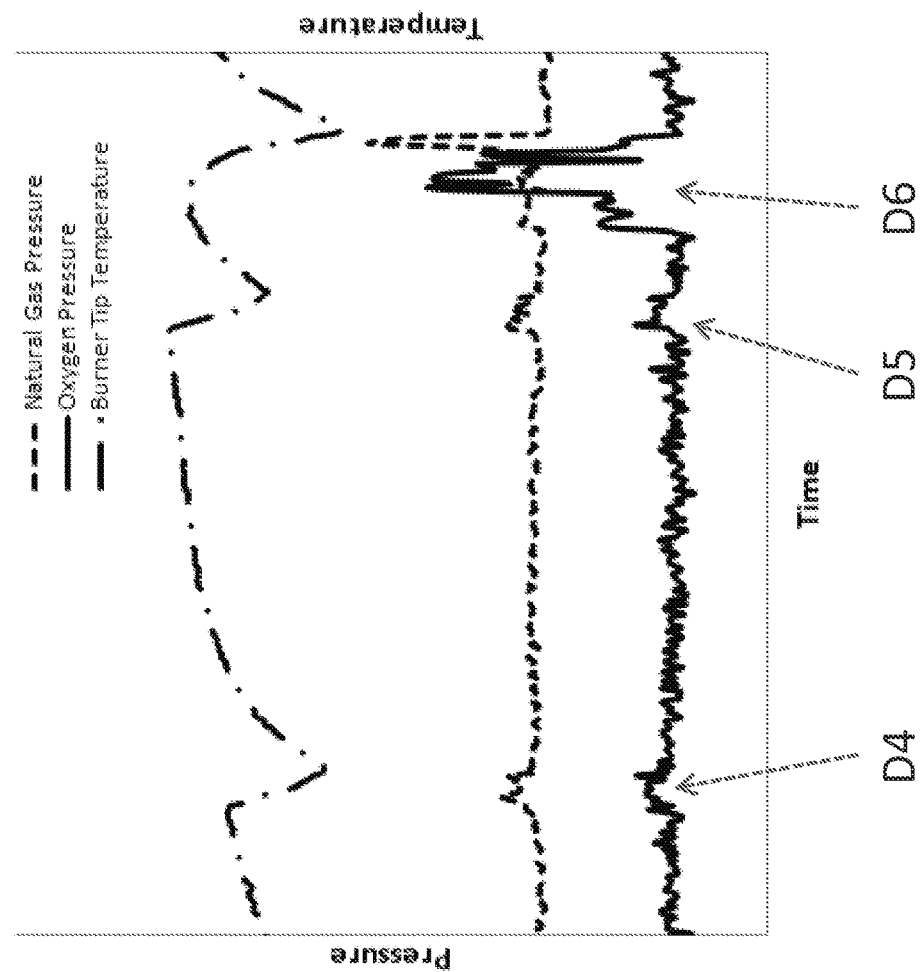
FIG. 14 is a graph illustrating exemplary effects of a blockage at a burner outlet on oxygen pressure, natural gas pressure, and burner tip temperature.

In another example showing the affects of obstructions, FIG. 14 shows natural gas and oxygen pressure in addition to burner nozzle tip temperature, both with and without an obstruction near the hot face of the burner block. In this example, the obstruction was placed near the hot face of the burner block three different times, denoted as D4, D5, and D6. In each case the nozzle tip temperature decreased (an unexpected result considering that the burner flame was impinging on the obstruction at the block exit) and the natural gas pressure and oxidant pressure both increased.

Figure 13:
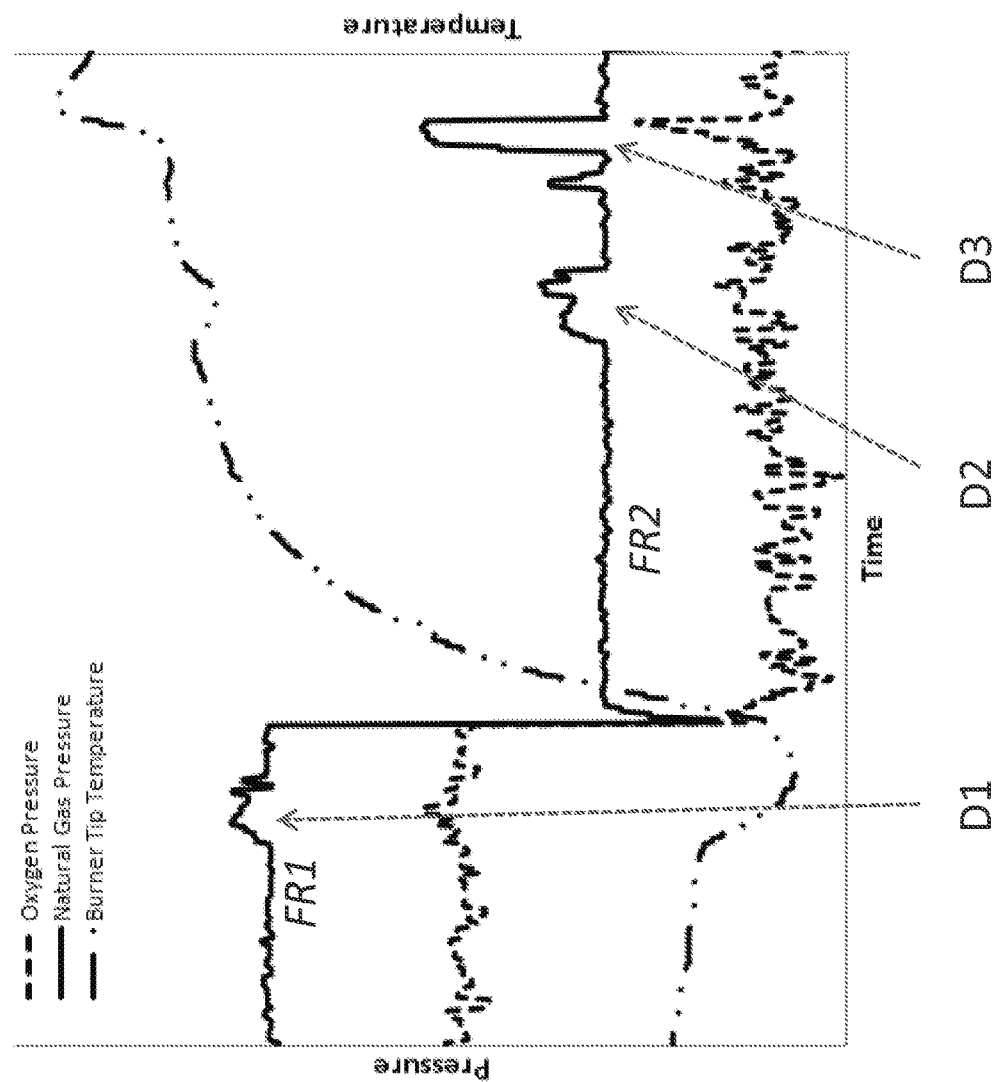
FIG. 13 is a graph illustrating exemplary effects of a blockage in front of a burner on oxygen pressure, natural gas pressure, and burner tip temperature.

In a similar example in FIG. 13, obstructions were placed near the hot face of the burner three different times at two different firing rates, denoted as D1 at a high firing rate FR1, and D2 and D3 at a lower firing rate FR2. When compared with FIG. 14, a similar result is seen for the first two obstructions D1 and D2, but for the third obstruction D3 the detected nozzle tip temperature initially decreased and then increased. It has been noticed that the directional change of the nozzle tip temperature is dependent on the operating conditions of the burner and the furnace that is being fired into. Therefore it is advantageous to use more than one sensor to identify that there are obstructions impeding the normal operation of the burner.

In another example, one or more temperatures sensors mounted near the face of the burner block or near the gas flow path can be used to detect flame deflection, for example by comparing burner block temperatures above and below the exit of the oxidant and fuel, or to the left and right of the exit of the oxidant and fuel. These measurements may be particularly useful with regard to the top (primary oxidant and fuel) exit as compared with the secondary oxidant exit. FIG. 18C shows temperature measurements in a burner block for a misaligned burner firing. In this example three thermocouples were embedded in the burner block positioned at three different distances from the block hot face: front, middle, and rear. The measured temperature increased for all three locations when impingement began. The magnitude of the temperature increased was a function of the position of the actual flame impingement, demonstrating the value of multiple temperature measurements for positively identifying flame impingement in the incipient stages and as soon as possible, In another example, the staging valve position by itself may be used to determine that the burner settings are optimized and that operators/engineers are aware when something has changed on the burner settings. Typically, the staging valve position is set during startup or commissioning to optimize burner performance for the particular furnace and process. The staging valve position would not normally be changed after startup. However, sometimes a staging valve may be accidentally or intentionally turned to a non-optimal position, and it would be important to identify such a condition to ensure that the burner is operating as desired.

In another example, the inlet oil temperature and possibly density may be used to estimate the oil viscosity at the atomizing nozzle. The viscosity is dependent on composition of the oil, so inlet oil temperature by itself cannot determine the viscosity, but it can provide information about the viscosity especially when combined with the inlet oil pressure (a function of the viscosity) and possibly density. This will let an operator know if the inlet temperature is appropriate and when combined with the pressure data, possibly if the oil composition has changed.

In another example, position and angle sensors can provide information about the orientation of the burner and whether it is installed properly, including whether the burner is level or at a desired slope or angle with respect to a furnace wall. For this purpose an accelerometer, gyroscope, or other device or combinations of devices can be used to determine the installation angle of the burner or parts of the burner. Knowing the burner angle with respect to the burner wall, as well as possibly other relevant angles that describe the position of the burner and/or burner block (e.g., the angle of furnace wall, the burner block, a burner mounting device or devices) can be used to help determine if the burner is installed properly. Misalignment of the burner could cause premature burner or burner block failure. For example, as shown in FIG. 17B, the angle of the burner with respect to the burner block and mounting plate was varied in both the pitch and roll directions, the burner was fired to check for flame impingement on the burner block. As used herein, pitch indicates rotation about an axis perpendicular to the longitudinal axis of the burner, so that the hot face the burner is pivoted up or down with respect to the rear of the burner; and roll indicates rotation about an axis coincident with the longitudinal axis of the burner, so that the plane of the burner face remains the same as the burner is rotated about its axis (see FIG. 17A). When the burner nozzle was mounted parallel with the flow passage in the burner block, no flame impingement was seen. When the angle of the burner nozzle was out of parallel by about 2 degrees flame impingement occurred.

In another example, monitoring may help optimizing operating conditions of the burner to reduce pollutant formation such as nitrogen oxides (NOx) and to maximize flame quality by reducing or eliminating sooting.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. oxy-fuel burner with monitoring, comprising:
a fuel passage terminating in a fuel nozzle;
a primary oxidant passage terminating in an oxidant nozzle;
a secondary oxidant passage spaced apart at a fixed distance from the primary oxidant passage;
a staging valve for proportioning oxidant between the primary and secondary oxidant passages;
one or more sensors including a nozzle temperature sensor for sensing at least one of an oxidant nozzle temperature and a fuel nozzle temperature, the one or more sensors further including a staging valve position sensor for sensing a staging valve position as indicative of the relative proportion of oxidant being directed to the primary and secondary oxidant passages; and
a data processor programmed to receive data from the sensors and to determine based on at least a portion of the received data the presence or absence of an abnormal burner condition including a potential partial obstruction of at least one of the primary oxidant passage and the fuel passage based on an increase or decrease in at least one of the oxidant nozzle temperature and the fuel nozzle temperature, wherein the data processor is further programmed to determine the presence or absence of a partial obstruction of the primary oxidant passage based on the staging valve position and at least one of the fuel nozzle temperature and the oxidant nozzle temperature.

2. The burner with monitoring of claim 1, wherein the data processor is programmed to base its determination at least in part upon changes in at least a portion of the received data with time.

3. The burner with monitoring of claim 1, the one or more sensors further including an oxidant pressure sensor positioned in the primary oxidant passage for sensing a primary oxidant pressure;
wherein the data processor is programmed to identify a potential partial obstruction of the primary oxidant passage based on a change to the primary oxidant pressure and at least one of the fuel nozzle temperature and the oxidant nozzle temperature.

4. The burner with monitoring of claim 1, further comprising:
a burner block having a hot face adjacent to the furnace; and
a burner block temperature sensor for sensing a burner block temperature near the hot face;
wherein the data processor is further programmed to determine the presence or absence of one or more of burner block overheating and flame asymmetry based on the burner block temperature.

5. The burner with monitoring of claim 1, further comprising:
a position sensor for sensing a burner installation angle, the position sensor being configured to sense one or more of a burner pitch and a burner roll;
wherein the data processor is further programmed to determine whether the burner is installed at a desired orientation with respect to at least one feature of the furnace based on the burner installation angle.

6. The burner with monitoring of claim 1, further comprising:
a data collector programmed to provide power to individual sensors only when data is to be collected, based on one or both of a combination of sensed data and a periodic schedule, and taking into account the specific requirements of each of the individual sensors;
a transmitter for wirelessly transmitting sensor data from the data collector to the data processor; and
a local power generation system for powering the data collector, the sensors, and the transmitter.

7. The burner with monitoring of claim 1, wherein the oxidant passage is annular and surrounds the fuel passage.

8. An oxy-fuel burner with monitoring, comprising:
a fuel passage termination in a fuel nozzle;
a primary oxidant passage terminating in an oxidant nozzle;
a secondary oxidant passage spaced apart at a fixed distance from the primary oxidant passage; and
a staging valve for proportioning oxidant between the primary and secondary oxidant passages;
one or more sensors including a nozzle temperature sensor for sensing at least one of an oxidant nozzle temperature and a fuel nozzle temperature, the one or more sensors further including:
an oxidant pressure sensor for sensing an oxidant pressure at one or more of upstream of the staging valve, downstream of the staging valve in the primary oxidant passage, and downstream of the staging valve in the secondary oxidant passage; and
a staging valve position sensor for sensing a staging valve position as indicative of the relative proportion of oxidant being directed to the primary and secondary oxidant passages; and
a data processor programmed to receive data from the sensors and to determine based on at least a portion of the received data the presence or absence of an abnormal burner condition including a potential partial obstruction of at least one of the primary oxidant passage and the fuel passage based on an increase or decrease in at least one of the oxidant nozzle temperature and the fuel nozzle temperature, wherein the data processor is further programmed to determine the presence or absence of one or more of a partial obstruction of one of the primary oxidant passage and the secondary oxidant passage and a sub-optimal staging valve position based on the staging valve position and the oxidant pressure at one or more of upstream of the staging valve, downstream of the staging valve in the primary oxidant passage, and downstream of the staging valve in the secondary oxidant passage.

9. The burner with monitoring of claim 8, further comprising:

two pressure sensors, one positioned on either side of a flow restriction device in at least one of the fuel passage, the primary oxidant passage, and the secondary oxidant passage, for sensing a pressure upstream of the flow restriction device, a pressure downstream of the flow restriction device, arid a differential pressure across the flow restriction device as indicative of flow rate;

wherein the data processor is further programmed to determine the presence or absence of an abnormal burner condition based on the differential pressure and one of the pressures upstream and downstream of the flow restriction device.

10. A method of determining an operating condition of an oxy-fuel burner including a fuel passage terminating in a fuel nozzle, a primary oxidant passage terminating in an oxidant nozzle, a secondary oxidant passage spaced apart at a fixed distance from the primary oxidant passage and a staging valve for proportioning oxidant between the primary and secondary oxidant passages, and a burner block having a face adjacent to the furnace, the method comprising:

sensing at least one of an oxidant nozzle temperature and a fuel nozzle temperature;

comparing the at least one nozzle temperature to a threshold temperature;

determining a potential partial obstruction of one of the oxidant nozzle and fuel nozzle based on an increase or decrease in the at least one nozzle temperature;

sensing an oxidant pressure at a location selected from upstream of the staging valve, downstream of the staging valve in the primary oxidant passage, and downstream of the staging valve in the secondary oxidant passage;

sensing a staging valve position indicating the proportion of oxidant being directed to the primary and secondary oxidant passages; and determining one or more of a potential partial obstruction of one of the primary oxidant passage and the secondary oxidant passage and a sub-optimal staging valve position based on the staging valve position and the oxidant pressure at one or more of upstream of the staging valve, downstream of the staging valve in the primary oxidant passage, and downstream of the staging valve in the secondary oxidant passage.

11. The method of claim 10, further comprising:

sensing an oxidant pressure;

determining a potential partial obstruction of the oxidant nozzle based on the oxidant pressure and the at least one nozzle temperature.

12. The method of claim 10, further comprising:

sensing pressures at two locations, one on either side of a flow restriction device in at least one of the fuel passage, the primary oxidant passage, and the secondary oxidant passage;

determining a flow rate from the pressures at the two locations; and determining the presence or absence of an abnormal burner condition based on the flow rate and the pressure of at least one of the two locations.

13. The method of claim 10, further comprising:

sensing a burner installation angle, including at least one of a burner pitch and a burner roll; and determining whether the burner is installed at a desired orientation with respect to at least one feature of the furnace based on the burner installation angle.

* * * * *